United States Patent [19]
Nguyen et al.

[11] Patent Number: 6,084,980
[45] Date of Patent: *Jul. 4, 2000

[54] METHOD OF AND APPARATUS FOR DERIVING DATA INTERMEDIATE TO CROSS-SECTIONAL DATA DESCRIPTIVE OF A THREE-DIMENSIONAL OBJECT

[75] Inventors: Hop D. Nguyen, Quartz Hill; Dennis R. Smalley, Newhall, both of Calif.

[73] Assignee: 3D Systems, Inc., Valencia, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/855,125

[22] Filed: May 13, 1997

[51] Int. Cl.$^7$ .................................................. G06K 9/00
[52] U.S. Cl. .................... 382/154; 364/474.24; 264/401; 264/22
[58] Field of Search .................. 382/154, 243, 382/241, 286, 293; 364/474.24; 264/401, 22

[56] References Cited

U.S. PATENT DOCUMENTS

| | | | |
|---|---|---|---|
| 4,575,330 | 3/1986 | Hull | 264/401 |
| 4,999,143 | 3/1991 | Hull et al. | 264/401 |
| 5,015,424 | 5/1991 | Smalley | 264/22 |
| 5,058,988 | 10/1991 | Spence | 264/401 |
| 5,059,021 | 10/1991 | Spence et al. | 264/401 |
| 5,059,359 | 10/1991 | Hull et al. | 264/22 |
| 5,076,974 | 12/1991 | Modrek et al. | 264/401 |
| 5,104,592 | 4/1992 | Hull et al. | 264/401 |
| 5,123,734 | 6/1992 | Spence et al. | 264/401 |
| 5,133,987 | 7/1992 | Spence et al. | 264/401 |
| 5,174,931 | 12/1992 | Almquist et al. | 264/401 |
| 5,182,055 | 1/1993 | Allison et al. | 264/22 |
| 5,182,056 | 1/1993 | Spence et al. | 264/401 |
| 5,182,715 | 1/1993 | Spence et al. | 264/401 |
| 5,184,307 | 2/1993 | Hull et al. | 364/474.24 |
| 5,209,878 | 5/1993 | Smalley et al. | 264/401 |
| 5,234,636 | 8/1993 | Hull et al. | 264/401 |
| 5,238,639 | 8/1993 | Vinson et al. | 264/401 |
| 5,256,340 | 10/1993 | Allison et al. | 264/401 |
| 5,321,622 | 6/1994 | Snead et al. | 364/474.24 |
| 5,597,520 | 1/1997 | Smalley et al. | 364/468.27 |

FOREIGN PATENT DOCUMENTS

| | | | |
|---|---|---|---|
| 0 473 142 | 3/1992 | European Pat. Off. | G06K 15/12 |
| EP 473 142 A2 | 3/1992 | European Pat. Off. | G06K 15/12 |
| WO 95-07509 | 3/1995 | WIPO . | |
| WO 95-29053 | 11/1995 | WIPO . | |

*Primary Examiner*—Joseph Mancuso
*Assistant Examiner*—Wasseem H. Hamdan
*Attorney, Agent, or Firm*—Forest L. Collins; Dennis R. Smalley

[57] ABSTRACT

A rapid prototyping and manufacturing apparatus and method (e.g. stereolithographic apparatus and a method) for layer-by-layer formation of a three-dimensional object represented by cross-sectional data including a method and apparatus for deriving data for at least a portion of a region intermediate to two successive cross-sections of data for use in forming the three-dimensional object with improved surface resolution. Outward-facing regions on two or more successive cross-sectional layers of the object are compared to determine whether the outward-facing region(s) associated with one of the layers represents what was originally intended to be a smooth transitional region (i.e. a sloping region) between two cross-sections or a discontinuous region (i.e. vertical transitional region) between two cross-sections. The comparison may involve utilization of common boundaries between outward facing regions on the cross-sections. The comparison may further involve the utilization of widths of the outward-facing regions on adjacent cross-sections.

32 Claims, 10 Drawing Sheets

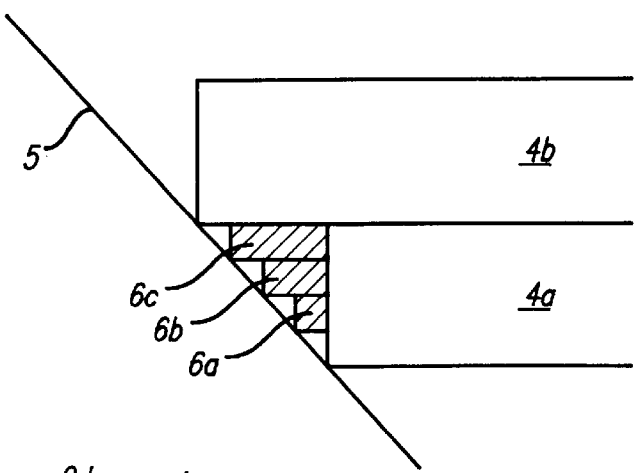
FIG. 2
PRIOR ART
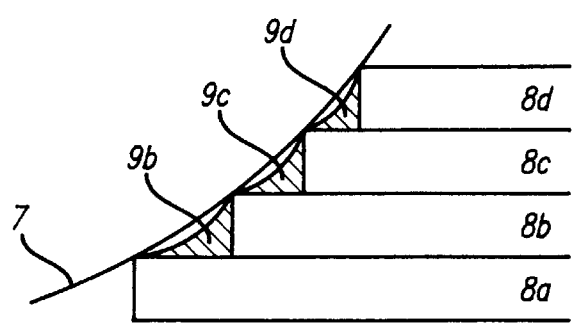
FIG. 3a
PRIOR ART
FIG. 3b
PRIOR ART
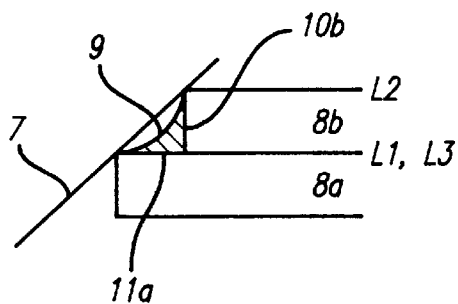 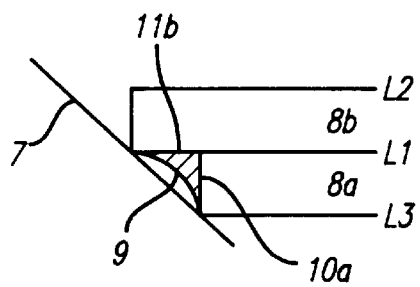
FIG. 3c
PRIOR ART
FIG. 3d
PRIOR ART
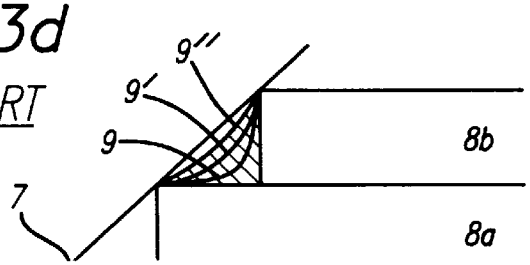

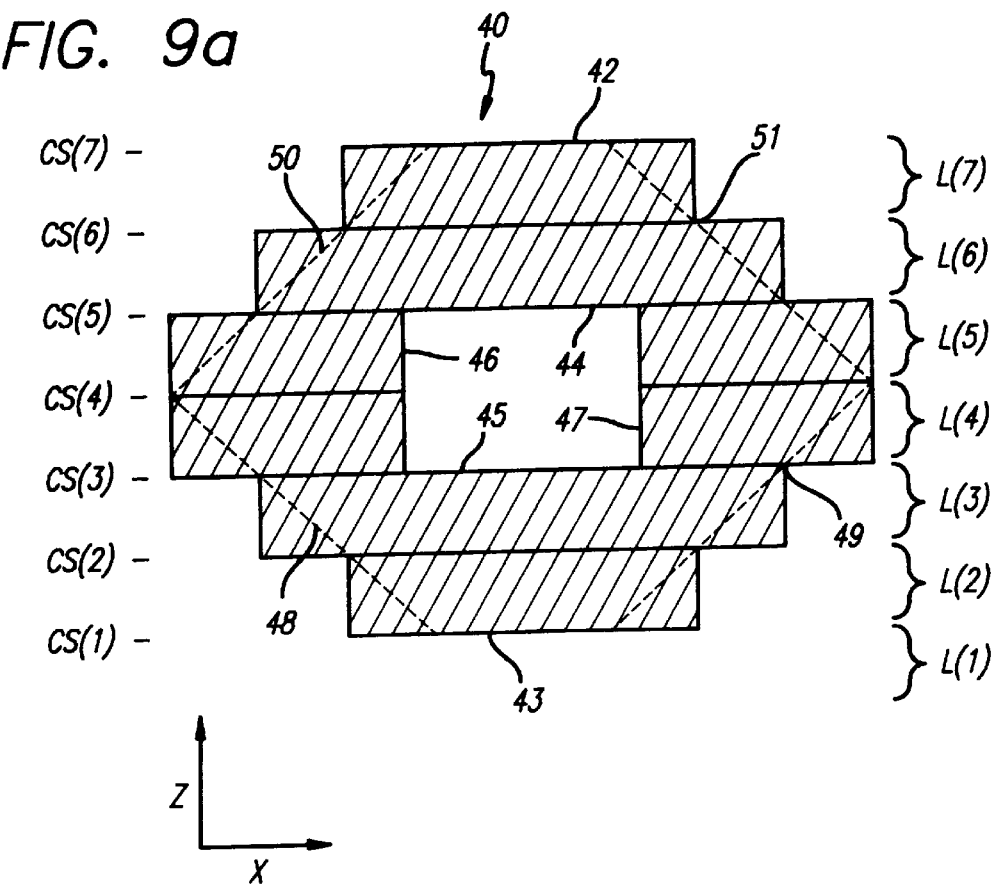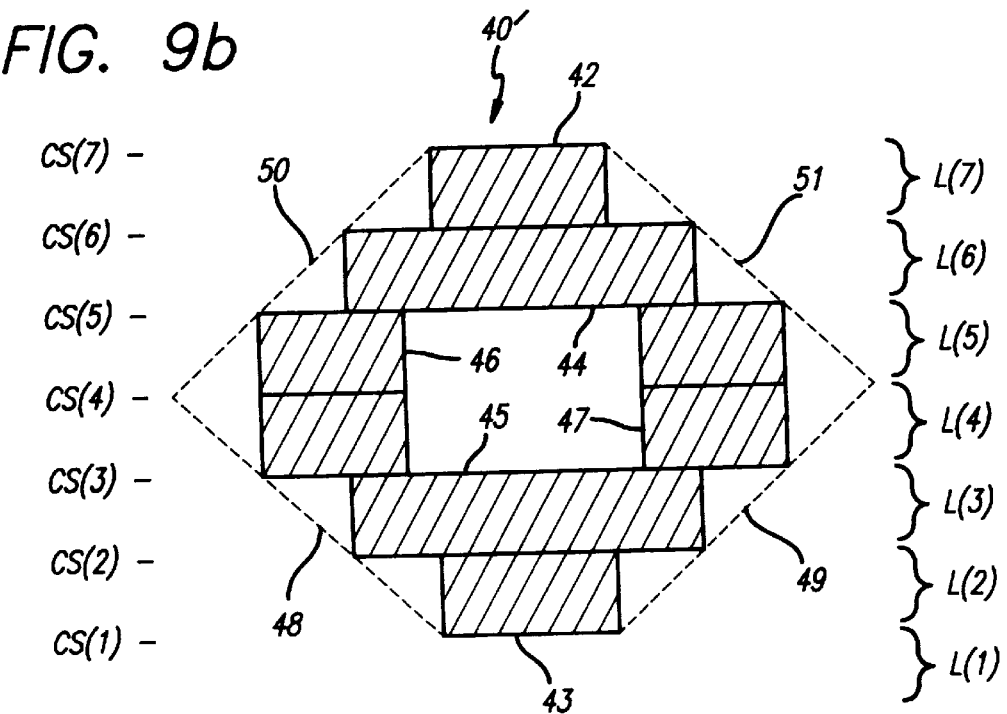

METHOD OF AND APPARATUS FOR DERIVING DATA INTERMEDIATE TO CROSS-SECTIONAL DATA DESCRIPTIVE OF A THREE-DIMENSIONAL OBJECT

FIELD OF THE INVENTION

The present invention relates generally to the field of forming three-dimensional objects through a layer-by-layer buildup in accordance with the principles of rapid prototyping and manufacturing (e.g. the principles of stereolithography). In particular, it relates to methods and apparatus for manipulating cross-sectional data to find data descriptive of regions intermediate to the cross-sections for improving the surface resolution of such objects.

BACKGROUND OF THE INVENTION

Various approaches to automated or semi-automated three-dimensional object production or Rapid Prototyping & Manufacturing have become available in recent years. Each approach is characterized in that it typically proceeds by building up 3D objects from 3D computer data descriptive of the objects in an additive manner from a plurality of formed and adhered laminae. These laminae are sometimes called object cross-sections, layers of structure, object layers, layers of the object, or simply layers (if the context makes it clear that solidified structure of appropriate shape is being referred to). Each lamina represents a cross-section of the three-dimensional object. Typically laminae are formed and adhered to a stack of previously formed and adhered laminae. In some RP&M technologies, techniques have been proposed which deviate from a strict layer-by-layer build-up process wherein only a portion of an initial lamina is formed, and prior to the formation of remaining portion(s) of the initial lamina, at least one subsequent lamina is at least partially formed.

According to a first approach (i.e. stereolithography), a three-dimensional object is built up by applying successive layers of unsolidified, flowable material to a working surface. The layers are then selectively exposed to synergistic stimulation in desired patterns, causing the layers to selectively harden into object laminae which adhere to previously-formed object laminae. Layer formation and solidification, in some circumstances, may occur simultaneously or almost simultaneously. In this approach, material is applied to all portions of the working surface. The material is applied to areas which will not become part of an object lamina, and to areas which will become part of an object lamina. Some basic aspects of stereolithography (SL), are described in U.S. Pat. No. 4,575,330, to Hull. According to one embodiment of Stereolithography, the synergistic stimulation is radiation from a UV laser, and the material is a photopolymer. Another example of stereolithography is called Selective Laser Sintering (SLS), as described in U.S. Pat. No. 4,863,538, to Deckard, in which the synergistic stimulation is IR radiation from a $CO_2$ laser and the material is a sinterable powder. A third example of stereolithography is called Three-Dimensional Printing (3DP) and Direct Shell Production Casting (DSPC), as described in U.S. Pat. Nos. 5,204,055 and 5,340,656, to Sachs, et al., in which the synergistic stimulation is a chemical binder, and the material is a powder consisting of particles which bind together upon selective application of the chemical binder.

According to a second such approach (Laminated Object Manufacturing—LOM), an object is formed by successively cutting object cross-sections, having desired shapes and sizes, out of sheets of material to form object laminae. Typically in practice, the sheets are stacked and adhered to previously cut sheets prior to their being cut, but cutting prior to stacking and adhesion is possible. Examples of this approach are described in U.S. Pat. No. 4,752,352, to Feygin; U.S. Pat. No. 5,015,312 to Kinzie; U.S. Pat. No. 5,192,559, to Hull, et al.; U.S. Pat. No. 5,524,232 to Burns; and EP Patent Publication No. 738583 to Morita, et al.

According to a third such approach, object laminae are formed by selectively depositing an at least partially unsolidified, flowable material onto a working surface in desired patterns in regions which will become part of an object laminae. After or during selective deposition, the selectively deposited material is solidified to form a subsequent object lamina which is adhered to the previously-formed and stacked object laminae. These steps are then repeated to successively build up the object lamina-by-lamina. This object formation technique may be generically called Selective Deposition Modeling (SDM). The main difference between this approach and the first approach is that the material is selectively deposited only in those areas which will become part of an object lamina. Examples of this approach are described in U.S. Pat. Nos. 5,121,329 and 5,340,433, to Crump; U.S. Pat. No. 5,260,009, to Penn; U.S. Pat. Nos. 4,665,492, 5,134,569, and 5,216,616, to Masters; U.S. Pat. No. 5,141,680, to Almquist, et. al; and U.S. patent application Ser. No. 08/535,772, to Leyden, et al.; Ser. No. 08/534,477, to Thayer, et al.; Ser. No. 08/722,335, to Leyden, et al.; and Ser. No. 08/722,326, to Earl, et al.

As noted above, stereolithography is a technique for stepwise or layer-by-layer build up of three-dimensional objects. In one embodiment of stereolithography, a three-dimensional object is formed in accordance with a corresponding object representation through a stepwise laminar buildup of cross-sections of the object at the working surface of a building material such as a polymerizable or solidifiable resin contained in a container. Each cross-sectional lamina is formed at the working surface of the building material by selectively transforming the material to a different physical form, such as a polymerized or otherwise solidified form, through exposure to a synergistic stimulation such as UV radiation. The cross-sectional laminae, as they form, are adhered to previously-formed laminae through the natural adhesive properties of the polymerizable resin as it solidifies. FIG. 1a illustrates a side view of a portion of an object 1 (the shaded area) formed by the layer-by-layer buildup of stereolithography. The layers forming the object are identified by numerals 1a–1i, respectively. Also shown is an object representation 2 according to which the object 1 is formed. The object representation 2 may be a data representation of the surface of the object, originating from a computer-aided design ("CAD") system or otherwise constructed by or put into a computer.

Because the layers forming the object have finite thicknesses, the object formed by a stereolithography apparatus ("SLA") or other layer-by-layer formation technique may have stair-step surface discontinuities, such as the areas identified by numerals 3a–3g in FIG. 1a. These surface discontinuities represent the deviations between the formed object 1 and the object representation 2. Such discontinuities generally lower the surface resolution of an object formed by an SLA. The magnitude of the surface discontinuities is partially determined by the thicknesses of the layers forming the object. Thicker layers typically lead to more significant surface discontinuities. FIG. 1b shows an object 1' formed according to the same object representation 2 as in FIG. 1a, but with thinner layers as identified by numerals 1a'–1r'. For object 1', the surface discontinuities, identified by numerals 3a'–3n', are less significant than the discontinuities for object 1 in FIG. 1a. In other words, the surface of the formed object 1' more closely matches the object representation 2. In addition to layer thickness, the magnitude of a surface discontinuity also depends on the geometry of the object surface. As shown in FIG. 1a, surface discontinuities are negligible at horizontal regions 2a and 2b, and vertical region 2c of the object representation, but are material at those surface regions that are neither completely horizontal nor completely vertical.

Several methods for improving object resolution have been proposed. One is to use building layers that are thin enough to adequately reduce surface discontinuities. This technique, however, is not generally feasible with the typical combinations of building material and synergistic stimulation available. The problems associated with this technique might include lack of structural strength during object formation, difficulties in controlling the precise layer thickness of the initially supplied unsolidified material, and longer object building time. Other proposed techniques for improving object resolution, as described in U.S. Pat. No. 5,184,307, involve post-processing steps such as sanding the formed part, or filling the surface discontinuities of the formed object with building material and subsequently curing it. These post-processing methods often involve manual processing. Manual processing can lead to inaccuracies in final object size and shape and can be time-consuming and/or expensive.

Methods for increasing object resolution by intermittent formation of fill layers inside the lamina-to-lamina surface discontinuities are disclosed in U.S. Pat. No. 5,209,878 (the '878 patent). One method of intermittent formation of fill layers is illustrated in FIG. 2, which shows two successive cross-sectional layers 4a and 4b of the object being formed (referred to as structural layers), and fill layers 6a–6c (depicted as hatched blocks). The fill layers 6a–6c have a thickness equal to a fraction of the thickness of the structural layer. Also shown in FIG. 2 is the object representation 5, against which the structural and the fill layers abut. It is seen from FIG. 2 that the object surface formed by structural layers 4a and 4b and the fill layers 6a–6c more closely matches the object representation 5 than an object surface formed by structural layers 4a and 4b alone. By using the fill layers, the structural layers can be formed at a greater thickness, yet the resulting object has reduced surface discontinuities equivalent to the discontinuities of an object formed with layers as thin as the fill layers.

The fill layers are formed intermittently with the adjacent structural layers, as opposed to being formed in a post-processing step after all the structural layers have been formed. For example, the layers may be formed in the order of 4a, 6a, 6b, 6c, 4b; or 4a, 4b, 6c, 6b, 6a. The latter sequence may require irradiating the building material through a previously formed layer 4b to form the fill layers 6c–6a. As the fill layers are formed, they are adhered to adjacent structural layers and/or previously formed fill layers. Other configurations for fill layers are described in the above referenced '878 patent.

The implementation of the fill-layer method is described in the '878 patent for an SLA using triangle data as an input object representation. Triangle data (typically provided in a form known as the STL format) is a form of input data for an SLA as manufactured by 3D Systems, Inc. of Valencia, Calif., in which the surface of the object to be formed is described by a plurality of tesselated triangles that collectively enclose the object. Triangle data may be generated, for example, by a CAD system. The three-dimensional object represented by the tesselated triangles may be "sliced" to obtain a set of cross-sectional data. The sliced data may describe the intersections of the object surface with a plurality of spaced parallel planes. Alternatively, the slice data may describe the object in a more complete and consistent manner such as in terms of an oversized, undersized, or other sized build style. The cross-sectional data may then be used by an SLA to control the laminae formation. Each cross-section of data corresponds to one lamina of the object, and the thickness of the laminae preferably corresponds to the distance between the successive parallel planes used for slicing. In practice the successive parallel planes may be thicker so as to allow adequate cohesion between layers or simply adequate cohesiveness within a single lamina. Methods for slicing a three-dimensional object represented by triangle data, including the primary features of commercial software programs SLICE and CSLICE, developed by 3D Systems, are described in U.S. Pat. Nos. 5,184,307; and 5,321,622, respectively. To implement the fill-layer methods for triangle input data, the object may be sliced at the thickness of the fill layers to obtain data for forming such fill layers. Alternatively, as explained in the '307 and '878 patents, slicing may occur at the spacing of the structural layers wherein fill layer data may be generated directly from sloping triangles (termed near-flat triangles in the '307 patent) that bridge the intermediate regions between successive structural layer contours. Techniques for deriving fill layer data or intermediate data from complete surface representations (e.g. STL files) of the object are described in the '878 patent in terms of preferred modifications to the SLICE or CSLICE programs.

Another technique for reducing lamina-to-lamina surface discontinuities is called meniscus smoothing. Meniscus smoothing is described in the '878 patent, and is illustrated in FIGS. 3a–3d. FIG. 3a shows a portion of an object formed by structural layers 8a–8d, and meniscus regions 9b–9d (depicted as hatched regions) that are formed adjacent the structural layers. These additional meniscus regions at least partially fill the step-like discontinuities formed by the structural layers.

The formation of a meniscus region is illustrated in FIGS. 3b and 3c. FIG. 3b illustrates formation of meniscus 9 in an up-facing discontinuity created by an up-facing surface area 11a of layers 8a and an end area 10b of layer 8b. The first step is to form layer 8a by exposing the building material, such as polymerizable resin, to a synergetic simulation such as a laser beam while the working surface of the building material is at level L1. Next, layer 8b is formed after the working surface has been relatively moved to level L2. Next, the level of the working surface is relatively moved to level L3, which is depicted as being the same as level L1. Alternatively level L3 may be different from level L1. For example, it could be lower relative to the object (i.e. layer 8b could be raised higher out of the building material). Because surface tension of the liquid material in combination with the surface energy of the solidified material, as the material recedes from above the up-facing area 11a adjacent the end area 10b, a meniscus 9 may be formed by the building material which remains in the discontinuity as shown. The next step is to expose all or a portion of the meniscus to the synergistic stimulation, thereby transforming it to the solid form. The result is a smoothed-over surface 9 that will more closely match the object surface 7. Similarly, FIG. 3c illustrates formation of meniscus 9 in a down-facing discontinuity created by a down-facing area 11b of layer 8b and an end area 10a of layer 8a. The first step is to form layer 8a while the working surface is at level L1. Next, relative to the object, the working surface is moved to level L2, and layer 8b is formed. Next, the working surface is relatively moved down to level L3, and as shown, a meniscus 9 formed by the working material may remain in the discontinuity. Finally, all or a portion of the meniscus is exposed and transformed by directing the synergistic stimulation through the already-formed layer 8b. Since the exact shape and size of the meniscus may not be known, an exposure may be given which will expose as much of the meniscus as possible without risking the passing of significant radiation through to the building material at working surface L3 which is to remain unexposed. Again, the result is a smoothed-over surface 9 that will more closely match the designed object surface 7. The meniscus smoothing process may be repeated to form multiple meniscuses on top of each other in the same discontinuity. For example, as shown in FIG. 3d, meniscus 9' may be formed over meniscus 9, and meniscus 9" over meniscus 9'.

In addition, meniscus smoothing may be used in combination with the fill-layer method, for example, by performing meniscus smoothing for each fill layer to reduce the remaining surface discontinuities after fill-layer formation. These techniques are also described in the '878 patent. Alternatively, meniscus smoothing could be performed for up-facing discontinuities while down-facing discontinuities may be cured with either fill layers, or with an exposure that continuously varies from the deepest part of the discontinuity to the shallowest part. If the object as formed, is going to be used as a master for tooling and if the tool only requires up-facing surface smoothness and accuracy, it may be acceptable to leave the down-facing regions unsmoothed.

As with fill layers, it may be inappropriate to meniscus smooth all surface lamina-to-lamina discontinuities as some discontinuities could be an object design feature. For example, as illustrated in FIG. 1a, the object surface 2 may have a "step" feature, such as that identified by numeral 2b, where an up-facing surface of layer 1c coincides with the true object surface. In this situation, smoothing should not be performed over the up-facing surface area 2b, or at least not over the entire area 2b. A need exists in the field, when working with initially supplied contour data, for a technique to reliably estimate which discontinuities should be filled and which should be left alone.

Up to this point, accurate implementation of the fill-layer and meniscus smoothing techniques described in the '878 patent has required that data descriptive of intermediate regions be supplied so that it was known which cross-sectional discontinuities were originally part of the object design and which resulted strictly from the layer-by-layer formation process. Where the initial object data indicated that an intermediate region was sloped (i.e. intended to be smooth not discontinuous) appropriate fill layer data could be generated. Accurate implementation of fill layers could not be performed when a type of input data was initially supplied that did not include information about intermediate regions. An example of such initially supplied data is contour data which may be supplied in the standard Stereolithographic Layer Contour format (SLC format). The contour data format describes a three-dimensional object by a set of cross-sectional contours representing the intersection of the object surface with a plurality of spaced parallel planes. The parallel planes are preferably equally spaced and the planes may or may not be located with the same spacing as required for forming the three-dimensional object. Contour data is typically produced, for example, during medical diagnostic processes by computer tomography (CT) techniques based on data generated by a scanning device such as X-ray, magnetic resonance imaging (MRI), magnetic imaging angiography (MRA), positron emission (PET), or ultrasonic radiation. Such data can be used to form implantable prostheses by stereolithography, or other RP&M system, as disclosed in PCT Publication No. WO 95/07509.

However, since contour data is not descriptive of the object surface between the contours (e.g. intermediate regions), it is uncertain whether or not any surface discontinuity between cross-sections should be smoothed with fill layers. As a result, the fill-layer technique and the meniscus smoothing technique described in the '878 patent cannot be directly applied to contour data. Meanwhile, the problem of lamina-to-lamina surface discontinuity may be especially severe for an object formed from some types of contour input data. For example, this may occur because the contours obtained from medical applications are typically relatively widely spaced, so that fewer tomographic layers are needed and the radiation dosage received by the patient during scanning is minimized. For example, layer data may be obtained at 1.0–3.0 mm intervals. This is much greater than the typical layer thickness of the structural layers used in a rapid prototyping and manufacturing system (e.g. structural layer thickness utilized in an SLA is typically 4 to 6 mils (approximately 0.1 to 0.15 mm) though it may extend upward to or beyond 20 mils (approximately 0.5 mm) in some circumstances. Thus, an object formed directly from contour data initially supplied at a 1.0 to 3.0 mm thickness will typically be formed with stair steps (i.e. lamina-to-lamina surface discontinuities) of the same height as the spacing of the initially supplied data as several identical laminae are formed prior to the data dictating a change in cross-sectional shape.

One way to utilize contour data to form an object, with reduced surface discontinuities, is to transform the contour data into triangle data, which may then be sliced at a desired thickness to form the object. An application of this method in anatomical modeling is described in PCT Publication No. WO 95/07509. Once the contour data is transformed into the triangle format, one of the fill-layer techniques or meniscus smoothing techniques may be implemented in the same manner as described in the '878 patent to reduce surface discontinuities. This approach, however, still fails to address the issue of intelligently and reliably estimating how a gap between cross-sections should be bridged.

Using initially supplied contour data also created uncertainty as to the accurate sizing of individual cross-sections. It was uncertain whether or not each cross-section or portion of each cross-section was representing an oversized, undersized, or other sized structure. To over-, under-, right-, or otherwise size the object cross-sections requires a knowledge of how the actual object is intended to transition from cross-section to cross-section or lamina-to-lamina. The sizing of objects is discussed in detail in the '307, '622 patents and in U.S. patent application Ser. No. 08/428,951, to Smalley, et al. As noted above, when using contour data as the initial input data, it has not been possible to make a reasonable determination as to where to place fill layers, solidify meniscus regions, or to uniformly size the laminae. It was of course possible to assume that fill layers, or meniscus regions should have been used to fill every discontinuity between cross-sections or to assume that none of the lamina-lamina surface discontinuities should be filled. Alternatively, it may have been assumed that only smaller discontinuities than a preset maximum would be used. Therefore, a need exists for a more reliable method of and apparatus for deriving intermediate region data (i.e. a method of and apparatus for interpolating between initially supplied contour data to derive intermediate data descriptive of at least portions of intermediate contour levels).

All the U.S. patents, U.S. applications, and PCT and EP publications referred to herein above, in this section of the application, are hereby incorporated by reference as if set forth in full herein.

ADDITIONAL RELATED PATENTS, APPLICATIONS, AND PUBLICATIONS

The patents and applications in the following table are hereby incorporated by reference herein as if set forth in full.

The gist of each patent and application is included in the table to aid the reader in finding specific types of teachings. It is not intended that the incorporation of subject matter be limited to those topics specifically indicated, but instead the incorporation is to include all subject matter found in these applications, patents, and the applications giving rise to those patents. The teachings in these incorporated references can be combined with the teachings of the instant application in many ways. For example, the references directed to various data manipulation techniques may be combined with the teachings herein to derive even more useful modified object data that can be used to more accurately and/or efficiently form objects.

| Patent No. Application No. | Inventor | Subject |
|---|---|---|
| 4,575,330 | Hull | Discloses fundamental elements of stereolithography. |
| 4,999,143 | Hull, et al. | Discloses various removable support structures applicable to stereolithography. |
| 5,058,988 | Spence | Discloses the application of beam profiling techniques useful in stereolithography for determining cure depth and scanning velocity, etc. |
| 5,059,021 | Spence, et al. | Discloses the utilization of drift correction techniques for eliminating errors in beam positioning resulting from instabilities in the beam scanning system |
| 5,076,974 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| 5,104,592 | Hull | Discloses various techniques for reducing distortion, and particularly curl type distortion, in objects being formed by stereolithography. |
| 5,123,734 | Spence, et al. | Discloses techniques for calibrating a scanning system. In particular techniques for mapping from rotational mirror coordinates to planar target surface coordinates are disclosed |
| 5,133,987 | Spence, et al. | Discloses the use of a stationary mirror located on an optical path between the scanning mirrors and the target surface to fold the optical path in a stereolithography system. |
| 5,174,931 | Almquist, et al. | Discloses various doctor blade configurations for use in forming coatings of medium adjacent to previously solidified laminae. |
| 5,182,056 | Spence, et al. | Discloses the use of multiple wavelengths in the exposure of a stereolithographic medium. |
| 5,182,715 | Vorgitch, et al. | Discloses various elements of a large stereolithographic system. |
| 5,184,307 from app. no. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,209,878 | Smalley, et al. | Discloses various techniques for reducing surface discontinuities between successive cross-sections resulting from a layer-by-layer building technique. Disclosed techniques include use of fill layers and meniscus smoothing. |
| 5,234,636 | Hull, et al. | Discloses techniques for reducing surface discontinuities by coating a formed object with a material, heating the material to cause it to become flowable, and allowing surface tension to smooth the coating over the object surface. |
| 5,238,639 | Vinson, et al. | Discloses a technique for minimizing curl distortion by balancing upward curl to downward curl. |
| 5,256,340 and 08/766,956 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets. |

-continued

| Patent No. Application No. | Inventor | Subject |
|---|---|---|
| 5,321,622 | Snead, et al. | Discloses a program called CSlice which is used to convert three-dimensional object data into cross-sectional data. Disclosed techniques include the use of various Boolean operations in stereolithography. |
| 5,597,520 and 08/428,951 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335 | Thayer, et al. | Discloses build and support styles for use in a selective deposition modeling system. |
| 08/722,326 | Earl, et al. | Discloses data manipulation and system control techniques for use in a selective deposition modeling system. |
| 08/790,005 | Almquist, et al. | Discloses various recoating techniques for use in stereolithography. |
| 08/792,347 | Partanen, et al. | Discloses the application of solid-state lasers to stereolithography. |
| 08/ | Partanen, et al. | Discloses the use of a pulsed radiation source for solidifying layers of building material and in particular the ability to limit pulse firing locations to only selected target locations on a surface of the medium. |
| 08/ | Manners, et al. | Filed concurrently herewith as 3D Docket No. USA.139. Discloses techniques for identifying features of partially formed objects. Identifiable features include trapped volumes, effective trapped volumes, and solid features of a specified size. The identified regions can be used in automatically specifying recoating parameters and or exposure parameters. |

The following two books are also incorporated by reference herein as if set forth in full:

(1) Rapid Prototyping and Manufacturing: Fundamentals of Stereolithography, by Paul F. Jacobs; published by the Society of Manufacturing Engineers, Dearborn Mich.; 1992; and (2) Stereolithography and other RP&M Technologies: from Rapid Prototyping to Rapid Tooling; by Paul F. Jacobs; published by the Society of Manufacturing Engineers, Dearborn Mich.; 1996.

SUMMARY OF THE INVENTION

It is an object of certain aspects of the invention to provide an improved method of and apparatus for approximating the configuration of a three-dimensional object at regions intermediate to originally provided cross-sectional data descriptive of the object.

It is an object of other aspects of the invention to provide a method of and apparatus for forming a higher resolution object than that dictated by the originally provided contour data descriptive of the object.

Further objects of other aspects of the invention are to provide methods of and apparatus for: (1) supplying complete cross-sectional data intermediate to originally supplied cross-sections, (2) modifying originally supplied data to size the object according to a desired style (e.g. oversized, undersized, average sized, super undersized and the like), (3) supplying data descriptive of fill layers to be formed adjacent to structural layers, and (4) supplying data descriptive of regions to be smoothed using meniscus smoothing.

One aspect of the invention provides a method of deriving intermediate data representing a region, for at least a portion of a three-dimensional object, intermediate to spaced cross-sectional data descriptive of the three-dimensional object, including the steps of: supplying first data representative of a first cross-section; supplying second data representative of a second cross-section adjacent to said first cross-section; supplying third data representative of a third cross-section adjacent to said second cross-section; deriving first outward-facing data including comparing the first and second data; deriving second outward-facing data including comparing the second and third data; determining which portions of the first outward-facing data have a common boundary with the second outward facing data; and deriving intermediate data for a region between the first and second cross-sections or a region between the second and third cross-sections using said portions of at least one of said first or second outward-facing data having a common boundary.

A second aspect of the invention builds on the first aspect by adding the steps of: determining a width of the first outward facing region; determining a width of the second outward facing region; and using the widths of the first and second outward facing regions in the step of deriving the intermediate data.

A third aspect of the invention uses at least some of the data from the first and second aspects of the invention to build up the object according to the principles of stereolithography, selective deposition modeling, and/or laminated object manufacturing.

A fourth aspect of the invention provides an apparatus for deriving intermediate data representing a region, for at least a portion of a three-dimensional object, intermediate to spaced cross-sectional data descriptive of the three-dimensional object, including: a first memory for receiving first data representative of a first cross-section; a second memory for receiving second data representative of a second cross-section adjacent to said first cross-section; a third memory for receiving third data representative of a third cross-section adjacent to said second cross-section; a first processor operating under control of a first algorithm for deriving first outward-facing data by comparing the first and second data; a fourth memory for storing the first outward facing data; a second processor operating under control of a second algorithm for deriving second outward-facing data by comparing the second and third data; a fifth memory for storing the second outward facing data; a third processor operating under control of a third algorithm for determining which portions of the first outward-facing data have a common boundary with the second outward facing data; and a fourth processor operating under control of a fourth algorithm for deriving intermediate data for a region between the first and second cross-sections or between the second and third cross-sections using said portions of at least one of said first or second outward-facing data having a common boundary.

A fifth aspect of the invention builds on the fourth aspect of the invention by further providing an apparatus for forming the three-dimensional object according to the principles of stereolithography, selective deposition modeling, and/or laminated object manufacturing.

According to a preferred embodiment of the present invention, estimated smoothing regions for lamina N between two consecutive contours N-1 and N are identified, for use in forming a higher resolution object, from potential smoothing regions (i.e. a discontinuous region resulting from two consecutive cross-sections N-1 and N not being identical) of a lamina N only when the potential smoothing region has a common boundary element (e.g. segment) with another potential smoothing region facing the same direction (i.e. both up-facing or both down-facing) for the lamina immediately above or below lamina N. In another preferred embodiment, the respective widths of the two potential smoothing regions which have a common boundary element satisfy a predetermined relationship. The widths of the potential smoothing regions may be determined using various erosion techniques. The width relationship may require that the widths fall within predetermined ranges, differences of the widths of the two regions fall within a predetermined range, or that the ratio of the widths thereof fall within a predetermined range. The widths may be minimum widths, maximum widths or effective widths defined according to specified criteria.

According to another embodiment of the present invention, estimated smoothing regions for lamina N between two consecutive contours N-1 and N are identified, for use in forming a higher resolution object, from potential smoothing regions of lamina N only when the potential smoothing region has both a common boundary element with another potential smoothing region facing the same direction for the lamina immediately above lamina N, and a common boundary element with a potential smoothing region facing the same direction for the lamina immediately below lamina N. In another preferred embodiment, the widths of the three potential smoothing regions which have common boundaries satisfy a predetermined relationship.

These and other objects, aspects, and advantages of the present invention will be further understood by studying the detailed description in conjunction with the drawings and the accompanying claims. It is intended that the above noted objects and aspects of the invention can be achieved and/or practiced alone or in combination with the other objects and aspects of the invention disclosed herein to more or less achieve various objects and advantages associated with the invention disclosed herein.

BRIEF DESCRIPTION OF THE DRAWINGS

A detailed description of embodiments of the present invention will be made with reference to the accompanying drawings, wherein like numerals designate like parts in the several drawings.

FIG. 2 (prior art) illustrates the use of fill layers to increase object resolution;

FIG. 3a (prior art) illustrates increasing object resolution by using meniscus smoothing;

FIGS. 3b (prior art) and 3c (prior art) show the forming of a meniscus adjacent to two structural elements.

FIG. 3d (prior art) depicts multiple meniscuses formed within a surface discontinuity;

FIG. 9a and 9b depict side views of the same object formed with an oversized build style and an undersized build style respectively;

FIG. 9c depicts a side view of the same object illustrated in FIG. 9a and FIG. 9b as formed with a simple cutting slicing style; and.

DETAILED DESCRIPTION OF PREFERRED EMBODIMENTS

Figure 1A:
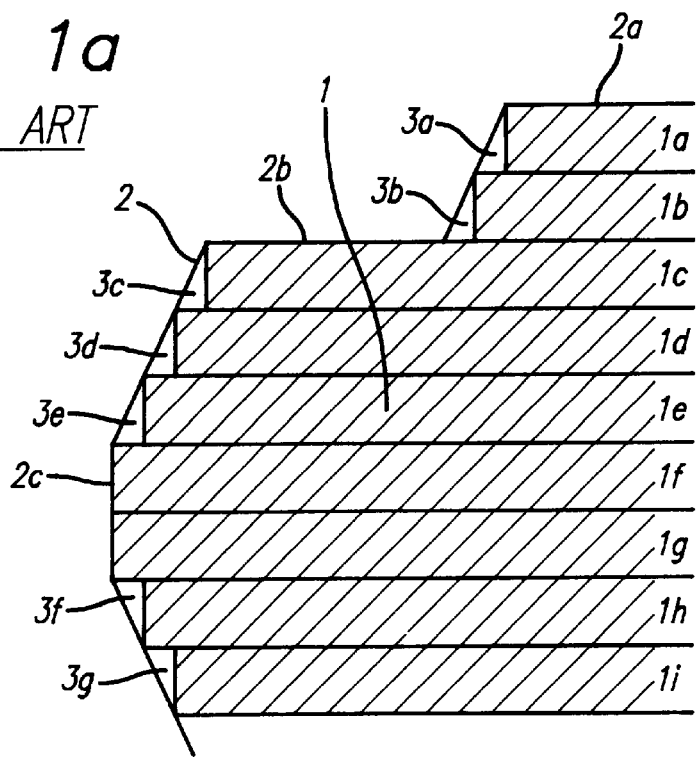
FIG. 1a (prior art) is a side view of an object formed by the stepwise layer-by-layer buildup.
Figure 1B:
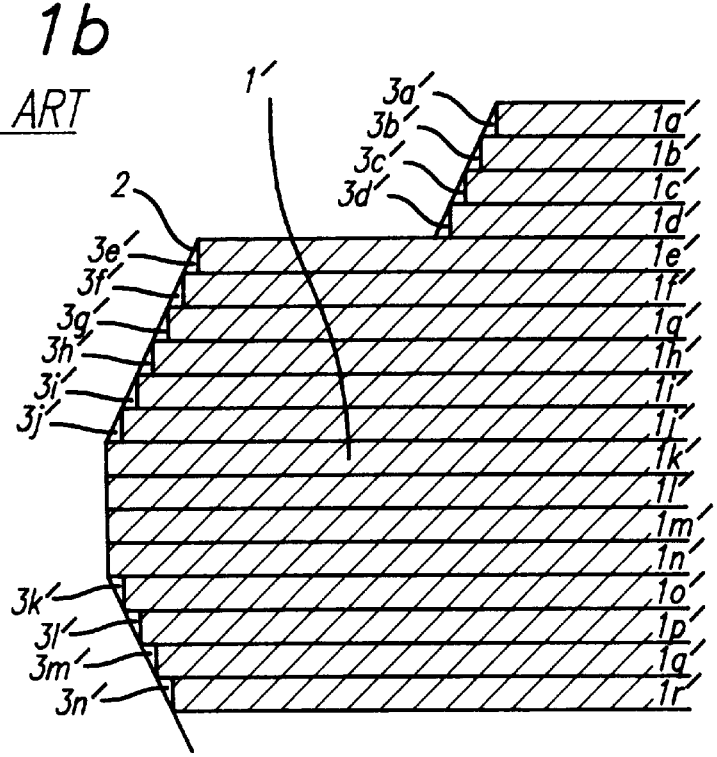
FIG. 1b (prior art) is a similar object as shown in FIG. 1a but formed with thinner layers.
Figure 4A:
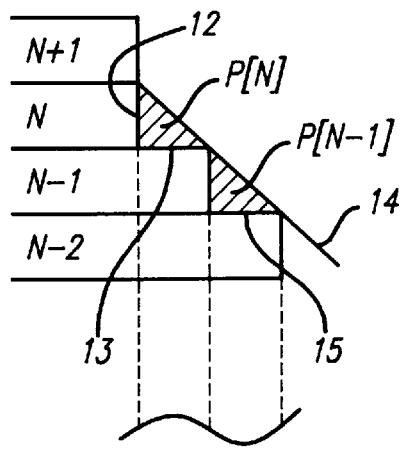
FIGS. 4a and 4b illustrate an example of two successive up-facing potential smoothing regions having a common boundary segment.

FIG. 4a is a side view of a portion of an object formed by structural layers N-2, N-1, N, and N+1. The layers have been identified in an ascending order from the bottom of the object to the top, e.g. layer N+1 being above layer N. This corresponds to forming the subsequent layers on top of previous layers. In other SLA constructions, the subsequent layer may be formed below the previous layers or beside the previous layer, therefore, layer N+1 may be below or beside layer N.

Figure 4C:
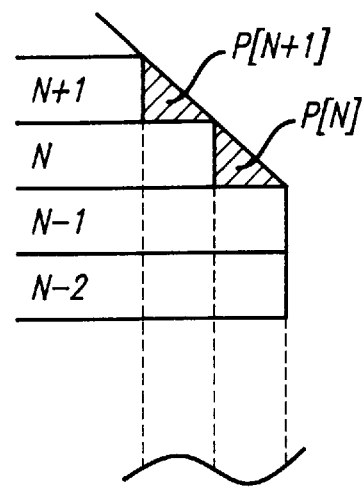
FIGS. 4c and 4d illustrate an example of two successive up-facing potential smoothing regions having a common boundary element.

The potential object surface for this portion of the object may be approximated by a potential object surface 14 having an up-facing sloped shape. Whether or not the potential object surface will become identified as an estimated object surface (i.e. the best estimate as to the intended design of the object surface) depends on the outcome of the interpolation techniques taught herein. Two potential smoothing regions (i.e. potential sloped regions) are depicted and identified as P[N] and P[N-1] for layers N and N-1, respectively. As illustrated, potential smoothing region P[N] for layer N is bound by an end surface 12 of layer N, an up-facing 13 of the layer N-1 which is immediately below layer N, and the potential object surface 14. Sometimes up-facing or down-facing regions are referred to as up-facing or down-facing areas, respectively. In some contexts the reference to an "area" is more correct as one may be referring to only the surface portion of the lamina or the cross-sectional data, while in other contexts the term "region" may be more correct as not only the surface area is being referred to but also the thickness of the lamina or layer as well. Herein both words may, at times, be used interchangeably wherein the context dictates whether a surface/thickness combination or just a surface is being considered. An up-facing region is a portion of a structural layer (i.e. lamina) not bounded from above by another lamina. (Similarly, a down-facing region is a region of a structural layer not bounded from below by another structural layer. Up-facing and down-facing regions may be generally referred to as outward-facing regions.) A potential smoothing region that is bound by an up-facing area from below may be referred to as an up-facing potential smoothing region. Similarly, FIG. 4e illustrates a down-facing potential smoothing region P[N] for layer N, which is bound by an end surface 12 of layer N, a down-facing region 20 of the layer N+1 which is immediately above layer N, and potential object surface 14.

Figure 4B:
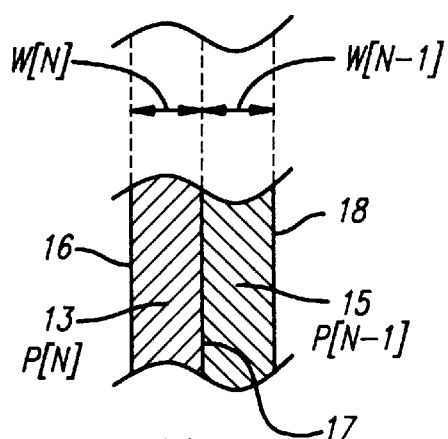

FIG. 4b is a top view of the same object shown in FIG. 4a, showing the up-facing area 13 of layer N−1 that bounds potential smoothing region P[N], and an up-facing area 15 of layer N−2 that bounds potential smoothing region P[N−1]. Potential smoothing region P[N] (13) has a boundary element (e.g. boundary region if considering pixel data or boundary segment if considering vector boundary data) 16 whose horizontal position corresponds to an end of layer N (i.e. lamina N), and a boundary element 17 which corresponds to an end of layer N−1. More precisely, boundary element 16 corresponds to an edge of the cross-sectional data for lamina N (if the data is considered to be associated with the upper portion of the lamina) and element 17 corresponds to an edge of the cross-sectional data for lamina N−1. Similarly, potential smoothing region P[N−1] (15) has a boundary element 17 which corresponds to an end of layer N−1, and a boundary element 18 which corresponds to an end of layer N−2. Boundary element 17 is a common boundary element of the two potential smoothing regions P[N] and P[N−1]. FIG. 4b also illustrates the widths W[N] and W[N−1] of the respective potential smoothing regions P[N] and P[N−1].

The illustrated embodiments of the present invention describe methods (and as implemented through software or hardware provide apparatus) for estimating whether a potential smoothing region P[N] (i.e. a "step" feature or a discontinuity between two consecutive laminae) on the object surface was originally intended to be a discontinuous object feature or a continuous feature (i.e. sloped feature). Based on that conclusion, the embodiments enable appropriate formation of the estimated object feature during formation of the object.

According to a first preferred embodiment of the present invention, smoothing data (i.e. estimated smoothing region data) will be generated and be made available for use in forming the object with smoothed surfaces (e.g. by meniscus smoothing or fill layer smoothing) for a potential smoothing region P[N] only if the following first condition ("smoothing conditions") is met: (1) P[N] is in the same orientation as, and has a common boundary element with, either (1a) a potential smoothing region P[N−1 for layer N−1 immediately below layer N, and/or (1b) a potential smoothing region P[N+1] for layer N+1 immediately above layer N.

According to alternative embodiments, for a potential smoothing region that faces upward, PU[N], to be identified as an estimated up-facing smoothing region, EU[N], the PU[N] must have a common boundary with a PU[N+1]. In other words, an EU[N] will be identified only if condition (1b) is met. According to other alternative embodiments, for a potential smoothing region that faces downward, PD[N], to be identified as an estimated down-facing smoothing region, ED[N], the PD[N] must have a common boundary with a PD[N−1]. In other words, an ED[N] will be identified only if condition (1a) is met.

A second preferred embodiment would additionally require that a second condition be met: (2) a width W[N] of potential smoothing region P[N], and a width W[N±1] of the potential smoothing region P[N−1] or P[N+1] identified in Condition (1) satisfy a predetermined relationship. Two potential smoothing regions are in the same orientation if they are both up-facing or both down-facing.

Figure 4D:
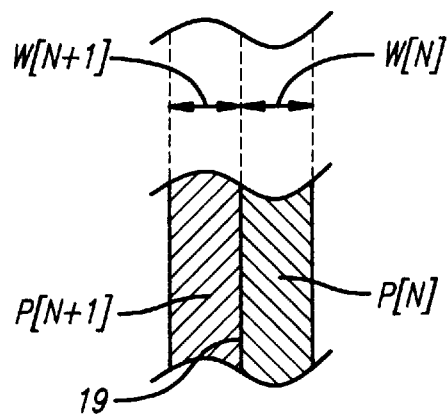
Figure 4E:
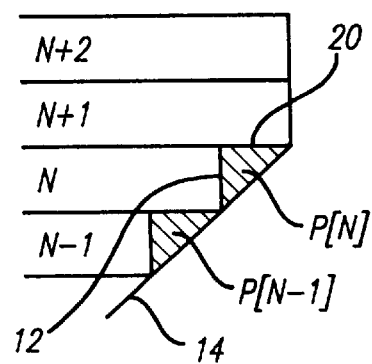
FIG. 4e illustrates two successive down-facing potential meniscus smoothing regions.

Condition (1a) for an up-facing potential smoothing region P[N] is illustrated in FIGS. 4a and 4b, where both potential smoothing regions P[N] and P[N−1] are up-facing and have a common boundary element identified by numeral 17. Condition (1b) for up-facing potential smoothing regions is illustrated in FIGS. 4c and 4d, where both potential smoothing regions P[N] and P[N+1] are up-facing and have a common boundary element identified by numeral 19. The potential smoothing region P[N] in FIG. 4a satisfies Condition (1a) but not Condition (1b), and the potential smoothing region P[N] in FIG. 4c satisfies Condition (1b) but not Condition (1a). Thus, both satisfy Condition (1). Other object configurations might satisfy both conditions simultaneously though in the first preferred embodiment it make no difference to the conclusion drawn. Condition (1) requires two successive potential smoothing regions of the same orientation for either one to be considered an estimated smoothing region. An underlying assumption in the first preferred embodiment for this condition is that most object regions do not have successive step-like features which are located at single layer thickness intervals (e.g. 0.05 to 1 mm).

Condition (2) (the "width requirement") may require that the ratio of the widths of the potential smoothing regions fall within a predetermined range, such as $$r_{min} \leq W[N]/W[N\pm1] \leq r_{max}, \quad (1)$$

where W[N] and W[N±1] are the respective widths of potential smoothing region P[N] and the adjacent region P[N±1] having a common boundary segment with P[N]; and $r_{min}$ and $r_{max}$ are two numerical values. Preferably, $r_{min}$ is less than or equal to one and $r_{max}$ is greater than or equal to one. For example, $r_{min}$ and $r_{max}$ may be 0.9 and 1.1 respectively, ½ and 2, respectively, or ⅓ and 3, respectively, etc. This equation encompasses the requirement that the widths of the two successive potential meniscus smoothing regions be equal, which is the case when both $r_{min}$ and $r_{max}$ are one. Depending on the results desired $r_{min}$ and $r_{max}$ need not be set to the same absolute values.

Alternatively, Condition (2) may require that the width difference of the respective potential meniscus smoothing regions fall within a predetermined range, such as $$d_{min} \leq W[N] - W[N\pm1] \leq d_{max}, \quad (2)$$

where $d_{min}$ and $d_{max}$ are two numerical values. Preferably, $d_{min}$ is less than or equal to zero and $d_{max}$ is greater than or equal to zero. The proper choices of $d_{min}$ and $d_{max}$ values may depend on the thickness of the structural layers that form the object. This equation encompasses the requirement that the two widths be equal, which is the case when both $d_{min}$ and $d_{max}$ are zero. For example, $d_{min}$ and $d_{max}$ might be set equal to −0.1 mm and 0.1 mm, respectively; −1 mm and +1 mm respectively, and the like. Depending on the results desired $d_{min}$ and $d_{max}$ need not be set to the same absolute values. In an alternative embodiment, $d_{min}$ and $d_{max}$ might be set for and compared to the absolute value of the difference of widths.

Alternatively, Condition (2) may require that the width of each potential smoothing region fall within a predetermined range, such as $$\begin{cases} w1_{\min} \le W[N] \le w1_{\max}, \\ w2_{\min} \le W[N \pm 1] \le w2_{\max}, \end{cases} \quad (3)$$

where $w1_{min}$, $w1_{max}$, $w2_{min}$, and $w_{max}$ are four numerical values, $w1_{min}$ and $w2_{min}$ being greater than or equal to zero. For example, $w1_{min}$ and $w2_{min}$ may be fractions of the thickness of the structural layer, while $w1_{max}$ and $w2_{max}$ may be a few times the thickness of the structural layer. It may be desirable to impose this width restriction because it may be hard to form a meniscus over an area that is too narrow or too wide relative to the layer thickness.

The values selected for $r_{min}$ and $r_{max}$, $d_{min}$ and $d_{max}$, and/or $w_{min}$ and $w_{max}$ may differ depending on whether up-facing or down-facing potential smoothing regions are being considered. More fundamentally, depending on the desired results, up-facing and down-facing regions may be treated in completely independent manners. For example, up-facing regions may undergo analysis according to the first or second preferred embodiments while down-facing regions may not even be considered as potential smoothing regions in any event or are alternatively always considered to be smoothing regions.

Alternatively, the width requirement of Condition (2) may be based on a combination of equations (1)–(3), or may comprise other relationships not described here. For example, in an alternative embodiment, the width requirement is a combination of equations (1) and (3), which requires that the width of each potential meniscus smoothing region fall within a predetermined range and that the ratio of the two widths fall within a predetermined range. As yet another alternative, the width requirement may be replaced by an area requirement. For example, the widths in each of equations (1)–(3) may be replaced by the areas of the corresponding up- or down-facing regions.

Figure 5A:
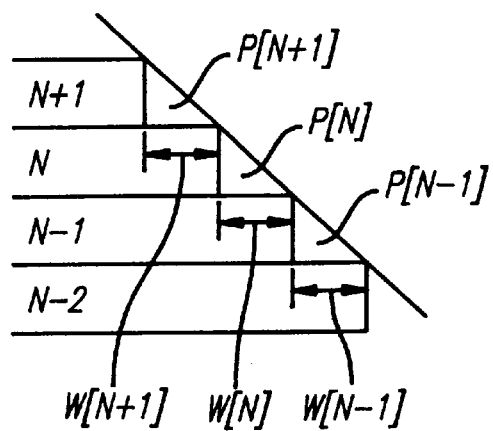
FIGS. 5a–5c illustrate alternative embodiments of the present invention.

A third embodiment of the present invention is illustrated in FIG. 5a. According to this embodiment, smoothing will be performed for a potential smoothing region P[N] for layer N only if a first condition is met: (1') P[N] is in the same orientation as, and has a common boundary element with, (1a') a potential smoothing region for layer N−1, P[N−1], and a common boundary element with (1b') a potential smoothing region for layer N+1, P[N+1]. A fourth preferred embodiment would additionally require that a second condition be met: (2') a width W[N] of potential smoothing region P[N], a width W[N−1] of potential smoothing region P[N−1], and a width W[N+1] of potential smoothing region P[N+1] satisfy a predetermined relationship.

As seen in FIG. 5a, according to Condition (1') of this embodiment, if three successive potential smoothing regions of the same orientation exist on consecutive cross-sections and adjacent pairs share a common boundary element, smoothing may be performed for the potential meniscus smoothing region in the middle.

The width requirement of Condition (2') may require that each pair of widths, i.e. W[N] and W[N−1], and W[N+1] and W[N], satisfy equations (1), (2) or (3) above or combinations thereof. For example, Condition (2') may require the ratio W[N]/W[N−1] to fall within a predetermined range, and the ratio W[N+1]/W[N] to fall within either the same or a different predetermined range.

Figure 5B:
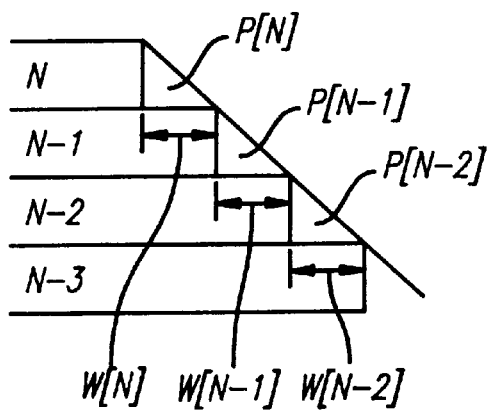
Figure 5C:
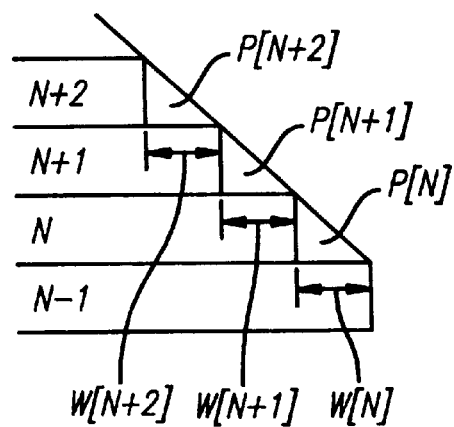
Figure 6A:
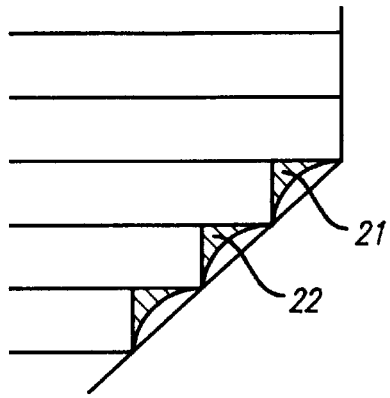
FIGS. 6a–6j depict possible transition regions for a slanted up-facing region.
Figure 6B:
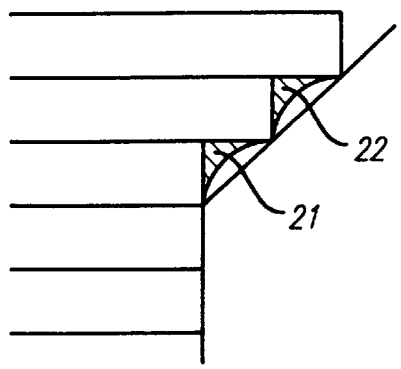
Figure 6C:
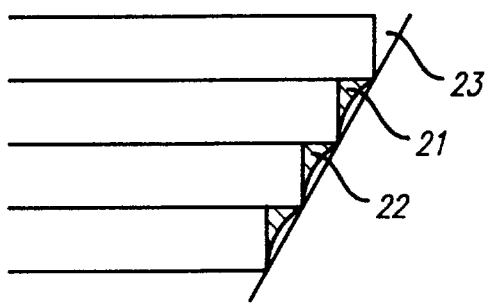
Figure 6D:
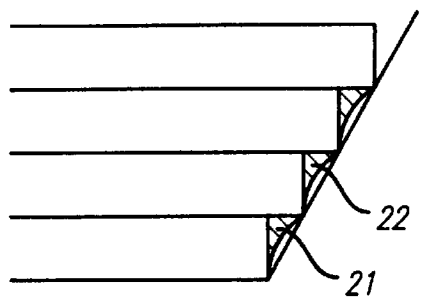
Figure 6E:
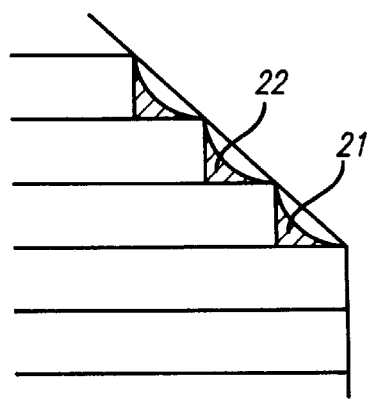
Figure 6F:
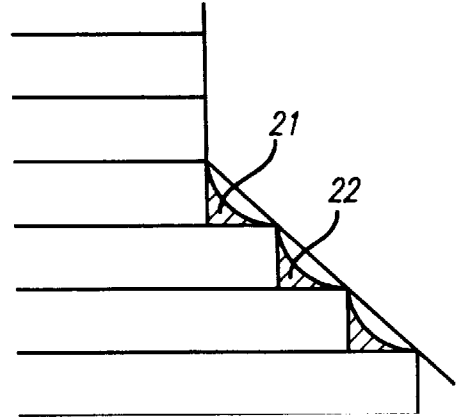
Figure 6G:
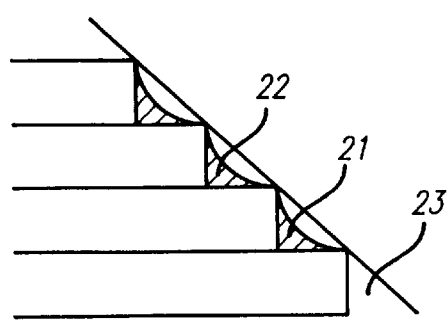
Figure 6H:
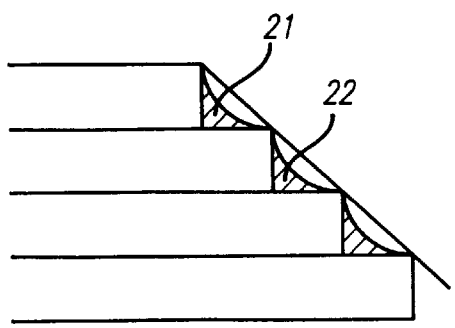
Figure 6I:
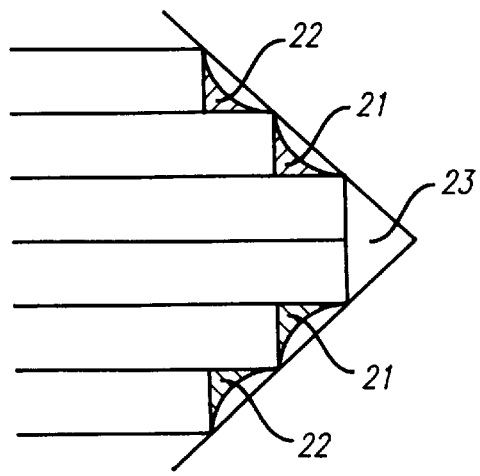
Figure 6J:
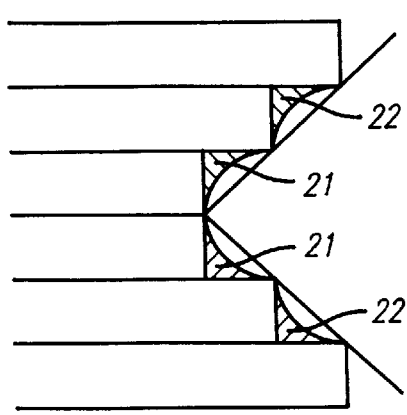

According to alternative embodiments of the present invention, smoothing will be performed for a potential smoothing region P[N] of layer N only if potential meniscus smoothing regions of the same orientation exist for two or more successive layers immediately above and/or immediately below layer N and if the potential meniscus smoothing regions for each pair of adjacent layers have a common boundary element. For example, FIG. 5b illustrates two successive potential smoothing regions P[N−1] and P[N−2], both of the same orientation as P[N], for layers N−1 and N−2 immediately below layer N. FIG. 5c illustrates two successive potential smoothing regions P[N+1] and P[N+2], both of the same orientation as P[N], for layers N+1 and N+2 immediately above layer N.

The effect of the various embodiments on smoothing operation near a transition region will now be explained. Transition regions are those regions where an up- or down-facing slanted region of the object surface meets a vertical region (e.g. a vertical wall), a horizontal region, or an oppositely slanted region. FIGS. 6a–6j depict the effect of smoothing near various kinds of transition regions, where numeral 21 identifies the region of interest near the transition. According to the first embodiment described above, which requires two potential consecutive smoothing regions of the same orientation (FIGS. 4a–14e), the potential smoothing region 21 nearest the transition in each of FIGS. 6a–6j will be filled by meniscus smoothing, because a potential meniscus smoothing region 22 of the same orientation exists either immediately above or immediately below region 21. Thus, no step-like discontinuity will remain on the object surface near the transition region. For the transitions depicted in FIGS. 6c, 6g and 6i, the region identified by numeral 23 in each case is not a potential meniscus smoothing region because they are not bound by either an up-facing area of the layer below or a down-facing area of the layer above. Thus, even though regions 23 may be a portion of the true object, they will not be treated as potential smoothing regions by the previously discussed smoothing embodiments. This, however, will only result in a blunted or vertically flat edge at the transition region, but not a step-like discontinuity on the object surface.

According to the third preferred embodiment, which requires a potential smoothing region of the same orientation both above and below the current layer (FIG. 5a), the potential meniscus smoothing regions 21 will not be filled; thereby leaving a step-like surface discontinuity in regions 21. Under the alternative embodiments that require two or more potential meniscus smoothing regions above and/or below the current layer, the conclusions as to where estimated smoothing regions will be identified may vary from those identified according to the first through fourth preferred embodiments.

An implementation of the first and second embodiments of the present invention will now be described. The mnemonics used in the description are defined below:

CS[N]: the cross-sectional data for layer N;

U[N]: an up-facing area of layer N;

D[N]: a down-facing area of layer N;

PU[N]: an up-facing potential smoothing region for layer N;

PD[N]: a down-facing potential smoothing region for layer N; and

P[N]: a potential smoothing region for layer N (either up-facing or down-facing).

EU[N]: an up-facing estimated smoothing region for layer N;

ED[N]: a down-facing estimated smoothing region for layer N; and

E[N]: an estimated smoothing region for layer N (either up-facing or down-facing).

Figure 7A:
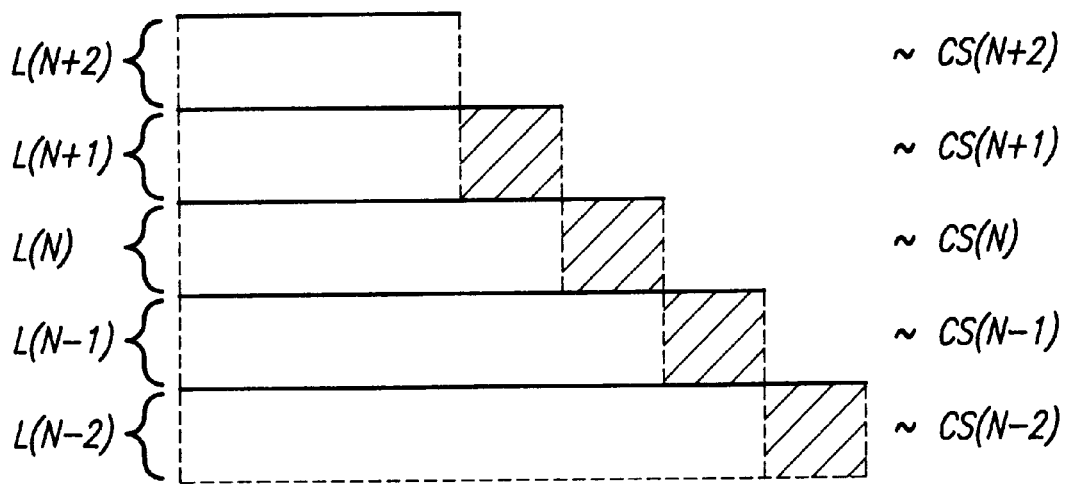
FIGS. 7a and 7b depict side views of an up-facing object portion and a down-facing object portion, respectively, wherein the relationship between lamina regions and cross-sectional levels is illustrated.
Figure 7B:
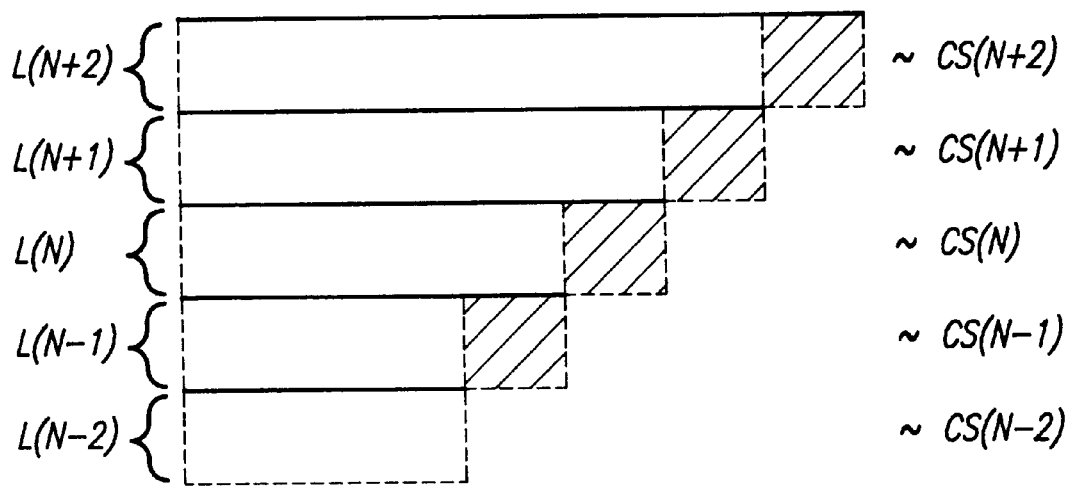

Layer N can be considered the region extending from cross-section N−1 to cross-section N, according a non-down-shifting embodiment of the Slice and CSlice programs, as described in the '307 and '622 patents, respectively. The relationship between lamina or layer regions and cross-sectional data levels is depicted in FIGS. 7a and 7b. FIG. 7a depicts a side view of cross-section levels and laminae for a series of layers containing up-facing regions. FIG. 7b depicts a side view of cross-section levels and laminae for a series of layers containing down-facing regions. In FIG. 7a and 7b the cross-sectional data CS are depicted at levels (N+2), (N+1), (N), (N−1) and (N−2). Each planar cross-section is intended to represent a laminae that spans the spacing between cross-sectional levels. The laminae are depicted with reference symbols L(N+2), L(N+1), L(N), L(N−1), and L(N−2) these lamina respectively span the regions between CS(N+2) and CS(N+1), CS(N+1) and CS(N), CS(N) and CS(N−1), CS(N−1) and CS(N−2), and CS(N−2) and CS(N−3) (Not shown).

On one hand, the total horizontal region spanned by a lamina L(N+2), L(N+1), L(N), L(N−1), and L(N−2) is solely dictated by its cross-sectional data CS(N+2), CS(N+1), CS(N), CS(N−1), and CS(N−2). On the other hand the detailed form (up-facing, down-facing, continuing regions) of the laminae are dictated by the relationship between that lamina and its neighboring laminae. Alternatively worded, the detailed form of the laminae are dictated by the relationship between the cross-section associated with that lamina and the neighboring cross-sections. For example, to define the up-facing regions of a lamina or cross-section one must look at the adjacent subsequent lamina or cross-section. To define the down-facing regions of a lamina or cross-section one must look at the adjacent preceding lamina or cross-section. To define continuing regions of a lamina or cross-section one must look at both the adjacent preceding and subsequent laminae or cross-sections. The up-facing region of each lamina in FIG. 7a is depicted by the hatched region associated with each lamina. The up-facing cross-sectional data associated with each up-facing region is found on the cross-sectional level associated with that lamina (i.e. associated with the cross-sectional level forming the upper bound of the lamina). The down-facing region of each lamina in FIG. 7b is depicted by the hatched region associated with each lamina. The down-facing cross-sectional data associated with each down-facing region is found on the cross-sectional level associated with that lamina (i.e. associated with the cross-sectional level forming the upper extent of the lamina). As such, the data associated with an up-facing feature is found at the cross-sectional level forming that feature, whereas the data associated with a down facing feature is found at the cross-sectional level which is one-layer thickness above the position where the down-facing feature will be located. In the teachings herein, the word "layer" may not only refer to laminae, as discussed above, it may also refer to the cross-sectional data associated with the lamina when it is clear from the context which is specifically meant or when it is not particularly relevant as to which is meant.

In a contour data format, each contour cross-section is preferably described by a set of polylists. A polylist is an ordered list of the coordinates of the vertices of a polygon that encircles a solid or a hollow region of the layer. Solid and hollow regions within a layer may be distinguished using the right-hand rule, according to which the line segments enclosing a solid region are ordered in a counter-clockwise direction and the line segments enclosing a hollow region are ordered in a clockwise direction.

In implementing the first embodiment, the following two steps are performed for each layer N and repeated for all layers. The first step (step S1) involves identifying all up-facing and down-facing potential smoothing regions for laminae N−1, N and N+1, i.e. PU[N−1], PU[N], PU[N+1], PD[N−1], PD[N], and PD[N+1]. As explained before, an up-facing potential smoothing region for laminae N corresponds to an up-facing area associated with cross-section N−1 which is immediately below layer N, and a down-facing potential smoothing region for layer N corresponds to a down-facing area associated with cross-section N+1 immediately above cross-section N. Therefore, step S1 involves identifying the following up- and down-facing areas: U[N−2], U[N−1], U[N], D[N], D[N+1], and D[N+2].

Methods for identifying up-facing or down-facing areas of a contour layer are described in the '622 patent. The up-facing areas of any layer N may be obtained by performing a Boolean subtraction of layer N+1 from layer N:

$$U[N] = CS[N] - CS[N+1]. \quad (4)$$

Similarly, the down-facing areas of any layer N may be obtained by performing a Boolean subtraction of layer N−1 from layer N:

$$D[N] = CS[N] - CS[N-1]. \quad (5)$$

Each resulting up-facing or down-facing area may also be represented by a polylist.

In the second step (step S2), each up-facing potential smoothing region for lamina N, PU[N], is compared with each up-facing potential smoothing region for lamina N−1, PU[N−1], and lamina N+1, PU[N+1], and each down-facing potential smoothing region for lamina N, PD[N], is compared with each down-facing potential smoothing region for lamina N−1, PD[N−1] and lamina N+1, PD[N+1], to determine whether any pair of the regions compared have a common boundary element. If a common boundary element is found, according to the first embodiment, a potential smoothing region for lamina N, PU[N] or PD[N], is defined as an estimated smoothing region for lamina N, EU[N] or ED[N] and is then usable in forming the object with a smoothed surface for that region of lamina N.

Step 2 is repeated for each P[N] on lamina N. For formation of the object, the smoothing data for lamina N (cross-section N), EU[N] or ED[N] may be associated with a higher or lower cross-section or even associated with one or more intermediate levels depending on the smoothing technique to be used and the order of formation to be followed.

The comparison of boundary elements can be accomplished in many ways including various vector techniques or bit map (i.e. pixel or voxel) techniques.

As an example, to determine whether two polylists have a common segment or portion of a segment, each line segment in the first polylist may be compared with each line segment in the second polylist to determine whether they share a common line segment. Since it is generally thought that the common line segments will be identical in orientation and length (i.e. position), the end points of line segments in one polylist (possibly including a delta value to deal with computer rounding issues) can simply be compared to the end points of segments in the second polylist to determine whether or not a common segment exists.

In situations where common end points may not exist, other comparison techniques may be used. For example, if a line segment in the first polylist is defined by two vertices A and B and if a line segment in the second polylist is defined by two vertices C and D, take the dot product of vectors AB and AC (i.e., the dot product of the X and Y components of the vectors) and divide by the product of the lengths of the two vectors, and take the dot product of vectors AB and AD and divide the product of the lengths of the two vectors. If the result of each operation is yields +1 or −1, within a specified tolerance limit, then it can be concluded that the two segments AB and CD (i.e., the four points A, B, C and D) lie on the same straight line. If the two segments lie on the same line, then the next task is to determine whether or not the two segments at least partially overlap. To determine if the segments overlap, the four points may be sorted according to their X- or Y-coordinates, and the order of the sorted points may be examined to determine whether at least one point from one of the segments lies between the two points of the other segment. If such is the case, then line segments AB and CD overlap and share a common portion of a line segment.

It may be desirable to put a low-end tolerance limit on the amount of overlap that the segments must have in order for the segments to be identified as common segments. This tolerance limit may help ensure that the segments do not merely touch at a single common point or otherwise have minimal overlap. In some embodiments, it may be possible to stop the process of finding common segments once one is found or alternatively the process may be continued so that all common segments may be found.

Alternative techniques might involve normalized dot products (yielding −1 or 1) or cross products (yielding 0) of AB and CD to determine whether or not the segments have the same orientation. If the segments have the same orientation, the four points can be ordered separately by their X and Y components to determine whether an overlap of segment AB and CD exists in X and Y respectively. If an overlap is found in both X and Y then the segments have a common portion.

A third step (step S3) may be added to implement the second embodiment. In this case, each pair of up- or down-facing regions of interest, for which at least one common portion of a boundary segment is found have their widths determined and tested against the width requirement of Condition (2). A width of a region may be defined operationally using repeated erosion operations such as the erosion operations associated with beam-width or line-width compensation. Various erosion methods and apparatus are described in the '622 and '307 patents and the '951, '956, and Docket U.S.A. 139 applications.

Figure 8A:
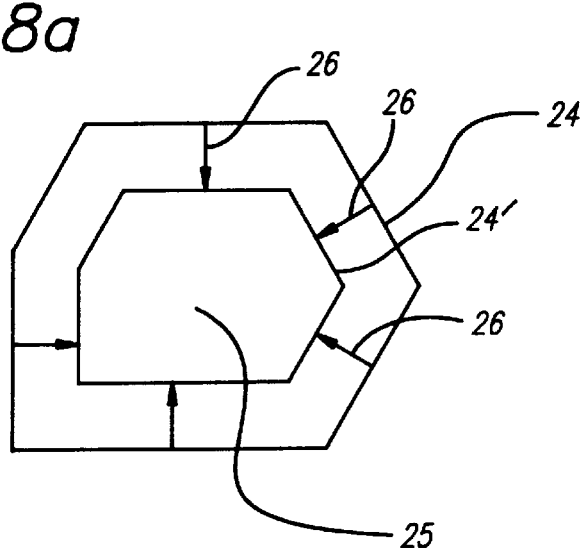
FIGS. 8a–8c illustrates an erosion method.

Erosion is an operation that may be performed on a boundary polyline that encloses a solid region, whereby the boundary segments are moved by a predetermined distance (the "step size") toward the solid region. Erosions of bit map data or of other data formats is also possible. FIG. 8a illustrates a boundary polyline 24 being moved toward the solid region and the resulting new boundary 24'. The direction and distance by which each boundary segment is moved are represented by arrows 26. The new solid region enclosed by the new boundary 24' is identified by numeral 25.

Figure 8B:
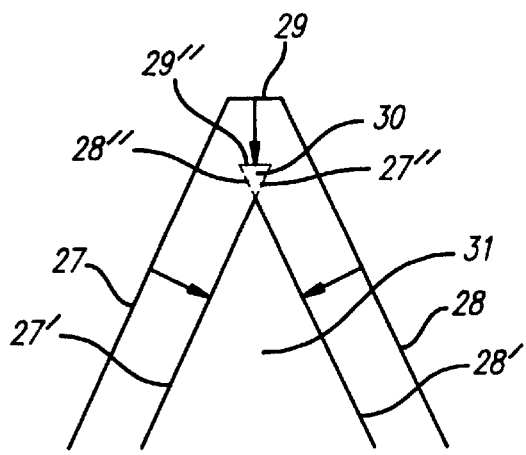
Figure 8C:
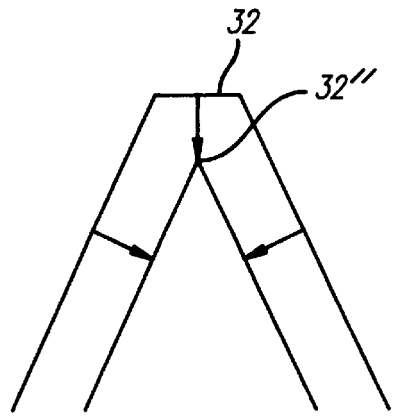

During an erosion process, a boundary segment may become zero or negative. FIG. 8b shows a boundary segment that becomes negative after an erosion operation. The arrows in FIG. 8b again represent the direction and distance by which the boundary segments are moved. Boundary segments 27, 28, and 29 become new segments 27', 28', and 29", respectively. New boundary segment 29", a portion 27" of new boundary segment 27', and a portion 28" of new boundary segment 28' enclose a negative area 30, i.e. an area that is not a part of the new solid region 31 after erosion. Thus, the new boundary segment 29" is not part of a new boundary that encloses the new solid region, but rather, a part of a boundary that encloses a negative region 30. Such a boundary segment 29" may be referred to as a negative segment. FIG. 8c shows a part of a boundary where an original boundary segment 32 becomes a point 32" after an erosion operation. Such a boundary segment 32" may be referred to as a zero segment.

The width of an area enclosed by a boundary polyline may be determined operationally by repeating the erosion operation on the boundary polyline until certain criteria are met. The width of the area may then be defined as twice the step size of each erosion multiplied by the number of erosions performed. For example, erosion operations may be repeated until a first boundary segment becomes zero or negative. The width so defined may be called the minimum width of the area. Alternatively, and preferably, erosion may be repeated until the entire area of the solid region becomes zero or negative. This may be called a "full erosion", and the width so defined may be called the maximum width of the area. As yet another alternative, a boundary segment of interest (e.g. a common boundary segment identified in step S2) may be flagged and monitored, and erosion performed until the flagged boundary segment becomes zero or negative. The width so defined may be called the width of interest. If more than one boundary segment is flagged, erosion may be performed until a first flagged boundary segment becomes zero or negative, or until all of the flagged boundary segments become zero or negative. The widths so defined may be called the minimum and maximum width of interest, respectively. Any of the widths defined above, or an average thereof, may be used to evaluate the width requirements of Condition (2).

If the width requirements are met, then potential smoothing region P[N] is an estimated smoothing region E[N] and is designated for smoothing. Step 3 is repeated for each region P[N] associated with Lamina N. Steps S1 through S3 may then be repeated for the next structural layer.

The contour data interpolation techniques described herein can also be used to improve the sizing or style of the contour data originally supplied. Sizing of and style for objects are described in the above referenced '307 and '622 patents and the '951 application. If one wants to form an accurately sized and shaped object and one wants to sand off the surface discontinuities between layers, one would like to have the basic shape of the object oversized such that the minimum horizontal extensions in sloped regions for each lamina protrude beyond the original design of the object. On the other hand if one wants to fill in the discontinuities with additional material, either during or after object formation, one would like the basic shape of the object to be undersized such that the maximum horizontal dimensions of the object extend no further than the original design of the object.

FIG. 9a depicts a side view (i.e. the Z-axis versus one of the horizontal axes, e.g. X) of an object 40 formed according to an oversized build style from a series of six lamina and seven initial cross-sectional data levels. The original object design envelope (the surface that describes the boundary of the object) is depicted by dashed lines. The laminae L(2), L(3), L(4), L(5), L(6) and L(7) are shown with solid horizontal and vertical bounding lines and with slanted lines showing the solidified interior portions. All horizontal design envelope surfaces 42, 43, 44, and 45 coincide with the horizontal object surface as formed. Similarly, all vertical design envelope surfaces 46 and 47 coincide with object surfaces as formed. On the other hand down-facing sloped or slanted designed surfaces 49 and 51, and up-facing sloped or slanted design surfaces 50 and 51 do not match the surface of the object as formed. The sloped or slanted regions of the original object design are only approximated by the formed lamina of the object. In the case of an oversized object, up-facing sloped regions are formed such that the top of the lamina extends far enough beyond the design envelope so that the bottom of the lamina just touches the design envelope. Further, in the case of an oversized object, down-facing sloped regions are formed such that the bottom of the lamina extends far enough beyond the design envelope so that the top of the lamina just touches the design envelope. An oversized object has the characteristic that removing material (e.g. by sanding) from the protrusions associated with the lamina-to-lamina discontinuities results in the formed object size matching the designed object size.

FIG. 9b depicts the same object as depicted in FIG. 9a wherein the object 40' is formed with an undersized build style instead of an oversized build style. As with the oversized build style, horizontal and vertical design surfaces match the object surfaces as formed. Further, as with the oversized build style, the down facing slanted designed surfaces 49 and 51, and up-facing slanted design surfaces 50 and 51 do not match the surface of the object as formed. In the case of an undersized object, up-facing sloped regions are formed such that the bottom of each lamina is pulled in from the design envelope so that the top of the lamina just touches the design envelope. Further, in the case of an undersized object, down-facing sloped regions are formed such that the top of the lamina is pulled in from the design envelope so that the bottom of the lamina just touches the design envelope An undersized object has the characteristic that filling material into the recesses associated with the lamina-to-lamina discontinuities results in the formed object size matching the designed object size.

Other sized objects exist and are further described in the above referenced patents and applications. It should be noted, that the sizing of these objects is not a natural consequence of extracting cross-sectional data and using the obtained data to blindly form object lamina. The basic principle of this statement, may be understood from studying FIGS. 9a and 9b. Though the object contacts seven cross-sectional levels, only six cross-sections of data are used to form the six lamina making up the objects.

Figure 9C:
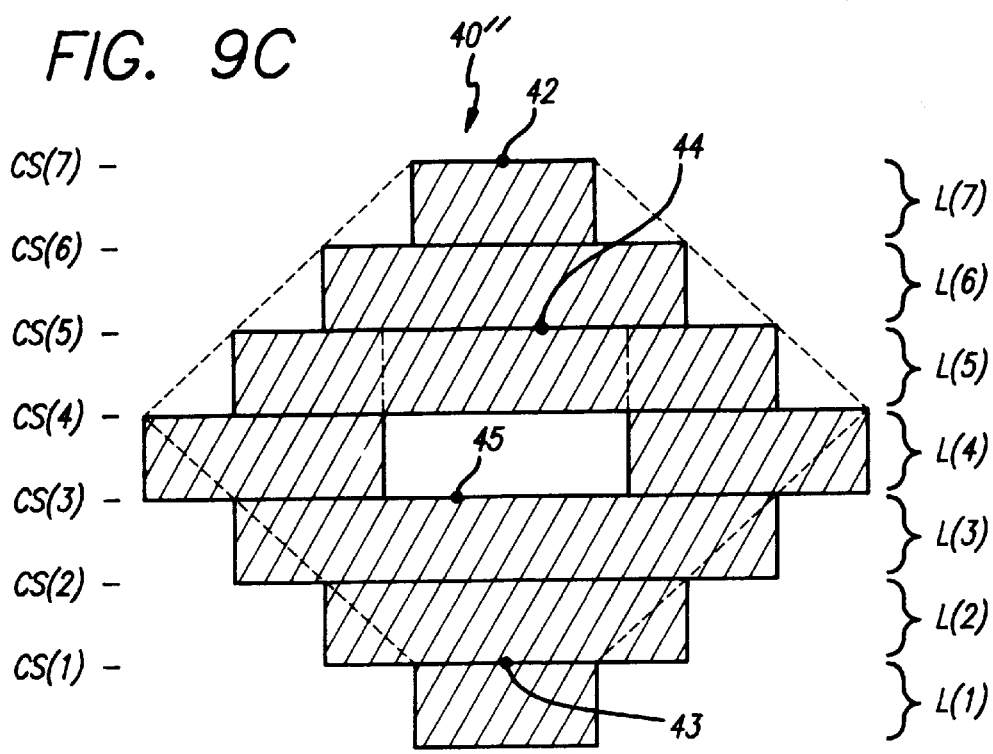

The result of blindly extracting cross-sectional data from cross-sectional levels and forming the object therefrom is illustrated in FIG. 9c. FIG. 9c depicts the same object as shown in FIGS. 9a and 9b with the exception that the object 40''' is not formed according to a desired build style or object sizing technique, instead the object is simply formed from the cross-sectional data extracted from the object design. Again the object design envelope is depicted by the dashed lines. The laminae L(1), L(2), L(3), L(4), L(5), L(6), and L(7) are shown with solid horizontal and vertical bounding lines and slanted lines filling the solidified interior portions. Unlike the object formed according to the oversized and undersized build styles, the formed object in FIG. 9c includes seven laminae formed from the seven cross-sectional levels. Furthermore, not all horizontal design envelope surfaces match the object surfaces as formed. The up-facing horizontal envelope surfaces 42 and 45 match the horizontal object surfaces as formed. The down-facing horizontal design surfaces, on the other hand, are located one cross-sectional level, or one layer thickness, above the locations where the formed down-facing horizontal object surfaces are placed. The sloped down-facing object surfaces are formed as if an oversized build style was being used while the sloped up-facing object surfaces are formed as if an undersized build style was being used.

Figure 9D:
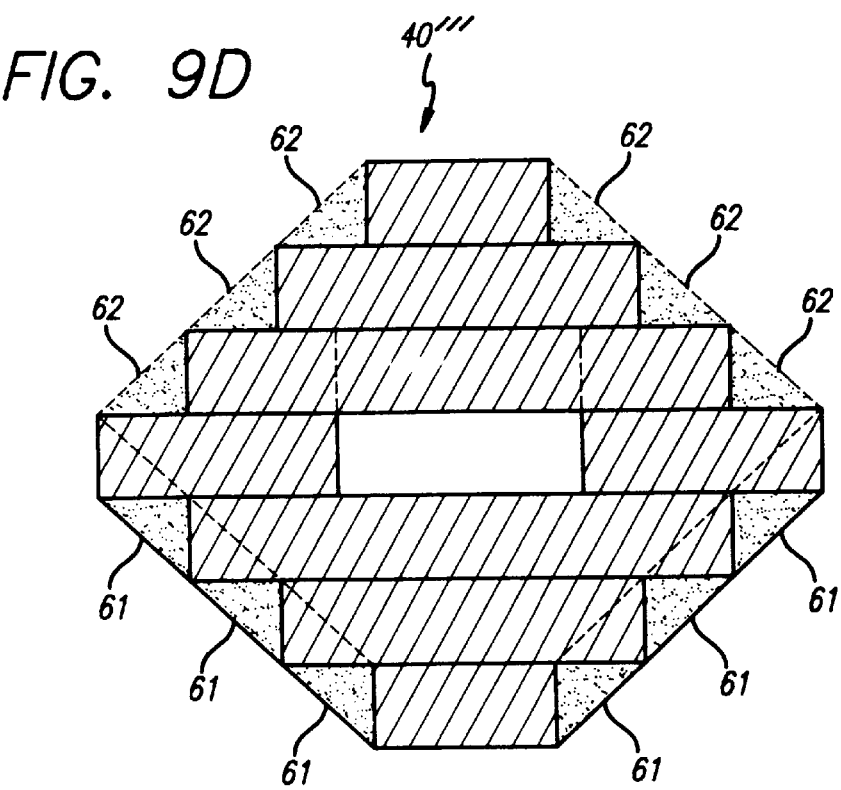
FIG. 9d depicts the same object as depicted in FIG. 9c with the estimated smoothing regions identified.

If it is assumed that contour data as provided is derived from cutting the object with slicing planes and extracting whatever intersections are found (i.e. simple cutting), then it can be concluded that an object formed from that cross-sectional data, even if estimated smoothing regions are found and utilized in forming the object, according to the above teachings, the object will be formed inaccurately. This situation is illustrated in FIG. 9d wherein the estimated down-facing smoothing regions 61 and estimated up-facing smoothing regions 62 are shown. As such, a fifth embodiment is proposed that utilizes the contour data interpolation techniques described herein to convert the initially supplied contour data into a uniformly oversized, uniformly undersized, or some other build style/size form. Once the original data is converted to the desired form, most preferably an undersized form, it may be further analyzed to provide estimated smoothing data. Of course as with the other embodiments described herein, some benefits may be gained by only performing a portion of the steps of the full preferred technique.

The following steps, for example, can be used to convert simple cutting technique contour data into uniformly over-sized or undersized object data:

(1) Receive cross-sectional data for each lamina N, CS[N] from simple cutting technique.

(2) Process the simple cutting technique data to find up-facing and down-facing regions, U[N] and D[N] respectively, for each cross-section N. Utilize Boolean operations as described in '622 patent. It is preferred that regions that are both up-facing and down-facing be independently treated as both U[N] and D[N] in the process of finding the estimated smoothing regions.

(3) Find the estimated smoothing regions EU[N] and ED[N] for each lamina N according to one of the embodiments described herein.

(4) Define ED[N−1] as the down-facing sloped portion of cross-section N, SD[N].

(5) Boolean subtract the SD[N], from D[N] to obtain the horizontal portion of cross-section N, HD[N]:

$$D[N]-SD[N]32\ HD[N].$$

(6) Define the U[N] as the horizontal up-facing region for cross-section N, HD[N].

(7) Define the EU[N] as the sloped up-facing region for cross-section N, SU[N].

(8) Obtain data descriptive of the appropriately sized object:

a. To obtain data descriptive of a uniformly oversized cross-section N, OSCS[N], Boolean add the CS(N) and the SU(N) and subtract the HD[N]:

$$OSCS[N]=CS[N]30\ SU[N]-HD[N].$$

b. To obtain data descriptive of a uniformly undersized cross-section N, USCS[N], Boolean subtract the HD[N] and the SD[N] from the CS[N]:

$$USCS[N]=CS[N]-SD[N]-HD[N].$$

(9) Process the OSCS[N} or the USCS[N] to obtain new up-facing, down-facing, continuing data, and the like for utilization in forming the three-dimensional object or for utilization in further data processing as appropriate.

Many alternative techniques for implementing various object sizing techniques will be apparent to one of skill in the art upon reviewing the teachings herein. For example, the derivation of data descriptive of a uniformly undersized object can be implemented according to the following two steps:

(1) Perform Boolean differencing operations between each pair of cross-sections at levels N and N−1, CS(N) and CS(N−1), respectively, to find down-facing regions associated with each cross-section N, D(N).

(2). Perform a Boolean subtraction of the down-facing region associated with cross-section N, D(N), from original cross-section N, CS(N), to derive an undersized version of cross-section N, USCS(N):

$$USCS[N]=CS[N]-D[N].$$

The first through fourth embodiments and the other alternative embodiments, thus far outlined, provide sufficient detailed information for deriving estimated smoothing regions for use with meniscus smoothing wherein the entire estimated smoothing region is typically exposed at a single time wherein the vertical shape of the solidified region is dictated by the vertical shape of the unsolidified material present. Further, as described above, the information gained about the estimated smoothing regions is appropriate for sizing the object in a desired manner. However, when it is desired to form fill layers or entire intermediate cross-sections, more detail about each estimated smoothing region must be obtained.

The following process may be used to derive full cross-sectional data for a vertical level intermediate to originally supplied cross-sectional data for cross-sections N and N+1:

(1) Determine the spacing $\Delta N$ between cross-sections N and N−1.

(2) Define an Intermediate Cross-Section at a fraction ($\delta$) of $\Delta N$ above level N−1, ICS[$\delta * \Delta N$], as the Boolean sum of three regions: (1) The common region between cross-section N−1 and cross-section N, (CS[N]∩CS[N−1], (2) A first additional region formed from a fraction of the estimated up-facing smoothing region associated with lamina N, UFSR$_\delta$[N], and (3) A second additional region formed from a fraction of the down-facing sloped regions associated with cross-section N, DFSR$_\delta$[N]:

$$ICS[\delta*\Delta N]=(CS[N]\cap CS[N-1])+UFSR_\delta[N]+DFSR_\delta[N]$$

(3) Derive the intersection region for CS[N] and CS[N−1]:
  a. Supply CS[N]
  b. Supply CS[N−1]
  c. Form the Boolean intersection of CS[N] and CS[N−1], according to the teachings of the '622 patent or the like.

(4) Derive Estimated Up-Facing Smoothing Region data for lamina N (located between cross-section N−1 and cross-section N and associated with cross-section N), EU[N] or UFSR[N]:

(5) Derive the desired fraction of the UFSR[N], UFSR$_\delta$[N]. The desired fraction of the UFSR[N] is that portion of the UFSR[N] that is located between cross-section N−1 and the level which is at $\delta * \Delta N$ above the cross-section N−1.
  a. Identify which portions of the boundary elements for the UFSR[N] are common with the boundary elements of cross-section N.
  b. If not already in bit map form, convert the UFSR[N] area into a bit map form wherein the bit map resolution is appropriate for the horizontal cross-sectional resolution desired.
  c. Identify which pixels are associated with the common elements identified in step (5a).
  d. Identify the distance (in number of pixel widths) of each pixel forming the UFSR[N] from the nearest pixel associated with the common pixels identified in step (5c).
  e. Determine the maximum distance any pixel is from the common elements identified in step (5c).
  f. Multiply (1−$\delta$) by the maximum distance found in step (5e) in order to derive a cut-off limit. The cut-off limit should be larger the closer the intermediate level is to cross-section N−1.
  g. Identify all those cells with a distance value, as identified in step (5d), which is less than the cut-off limit as belonging to the UFSR$_\delta$[N].
  h. If desired, convert the bit map form of the UFSR$_\delta$[N] into another data format.

(6) Derive Estimated Down-Facing Smoothing Region data for lamina N, (located between cross-section N−1 and cross-section N and associated with cross-section N), ED[N] or DFSR[N]:

(7) Derive the desired fraction of the DFSR[N], DFSR$_\delta$[N]. The desired fraction of the DFSR[N] is that portion of the DFSR[N] that is located between cross-section N−1 and the level which is at $\delta * \Delta N$ above the cross-section N−1.
  a. Identify which portions of the boundary elements for the DFSR(N) are common with the boundary elements of cross-section N−1.
  b. If not already in bit map form, convert the DFSR[N] into a bit map form wherein the bit map resolution is appropriate for the desired cross-sectional resolution.
  c. Identify which cells or pixels are associated with the common elements as identified in step (7a).
  d. Identify the distance (in pixel widths) for each pixel forming the DFSR[N] from the nearest pixel associated with the common pixels identified in step (7c).
  e. Determine the maximum distance any pixel is from the common pixels identified in step (7c).
  f. Multiply ($\delta$) by the maximum distance found in step (7e) in order to derive a cut-off limit. The cut-off limit should be smaller the closer the intermediate level is to cross-section N−1.
  g. Identify all those cells with a value less than or equal to the cut-off limit as belonging to the DFSR$_\delta$[N].
  h. If desired, convert the bit map form of the DFSR$_\delta$(N) into another data format.

8) Derive the ICS[$\delta * \Delta N$] by summing the results of steps 3, 5 and 7. Convert the format of the ICS[$\delta * \Delta N$] into another format if desired.

In the above process, if it is desired to produce a single intermediate cross-section midway between cross-section N−1 and cross-section N, $\delta$ would be set at 0.5. On the other hand if three evenly spaced intermediate cross-sections were desired, $\delta$ might be set initially at 0.25, then 0.50, and finally 0.75 for each pair of initial cross-sections supplied.

If it is desired to derive fill layer data instead of full cross-sectional data only, those steps for deriving UFSR$_\delta$[N] and/or DFSR$_\delta$[N] need be performed as these regions represent the fill layer attributes at the fractional amount $\delta$ between cross-sections N−1 and N.

Various modifications to the above process for obtaining intermediate cross-sectional data or fill-layer data will be apparent to those of skill in the art after studying the teachings herein. As a first example, step (5a) might be modified. This modification might replace step (5a) with (5a'):

5a'. Identify which portions of the boundary elements for each UFSR[N] are common with the boundary elements of an up-facing potential smoothing region on lamina N+1, PU[N+1], which gave rise to the conclusion that UFSR[N] exists. If a PU[N+1] did not give rise to the conclusion that a particular UFSR[N] exists, identify which portions of the boundary elements for that UFSR[N] are common with the boundaries of cross-section N. Identify the portions found in this step as common elements.

Similarly step (7a) might be replaced with a step (7a'):

7a'. Identify which portions of the boundary elements for each DFSR[N] are common with the boundary elements of a down-facing potential smoothing region on lamina N−1, PD[N−1], which gave rise to the conclusion that DFSR[N] exists. If a PD[N−1] did not give rise to the conclusion that a DFSR[N] exists, identify which portions of the boundary elements for the DFSR[N] are common with the boundaries of cross-section N−1. Identify the portions found in this step as common elements.

Various other modifications can be made to steps 5a and 7a. For example, in step (5a) common boundaries between the UFSR[N] and the PU[N−1] might be found and utilized as the basis for completing the rest of step 5 wherein appropriate modification would be made to the rest of the steps since the common boundaries found no longer belong to cross-section N, but instead belong to cross-section N−1. Similarly, an analogous change could be made to step 7a wherein appropriate changes to the rest of the step 7 could be made since the common boundaries found would no longer belong to cross-section N−1, but instead would belong to cross-section N. Instead of basing comparisons on entire cross-section boundaries or on the PUs and PDs which gave rise to the conclusion that a UFSR[N] or DFSR[N] exist, comparisons might be based on other regions or boundary types.

As another example, the technique of determining the cut off limits in steps (5e & 5f) and (7e and 7f) may be modified. Instead of simply determining the maximum distance and multiplying that distance by $(1-\delta)$ or $\delta$, one might analyze the data to determine how many pixels exist at each distance. From this analysis an effective distance (preferably less than the maximum distance) might be derived, wherein the effective distance would be multiplied by $(1-\delta)$ or $\delta$ to derive the cut-off limit. The analysis might involve setting the effective distance at value where there appears to be a significant dropping off in the number of cells found at a given distance. Alternatively, the effective distance might be set at an absolute number descriptive of a maximum smoothing distance to be handled. Alternatively, the maximum smoothing distance might be set as the smaller of the width of the DFSR[N] or the UFSR[N] and the width of D[N±1] or UN±1] that gave rise to the smoothing region identification for cross-section N in the first place.

The preferred method of forming objects utilizing the enhanced data manipulation techniques described herein is stereolithography. In particular, the preferred stereolithographic systems that could be modified according to the teachings herein to implement the present invention include the SLA 250/50, the SLA 350/10 and the SLA 500/40 and their associated computer programs as manufactured and sold by 3D Systems, Inc. of Valencia, Calif. The enhanced data manipulation techniques could also be used to benefit objects formed using the other rapid prototyping and manufacturing processes noted above. Preferred stereolithography building materials include SL 5170, SL 5180, and SL 5190 as manufactured by Ciba Specialty Chemicals of Los Angeles, Calif. The preferred smoothing technique for up-facing surfaces is meniscus smoothing which may be implemented according to the following steps:

1. Identify up-facing regions which are to be smoothed in association with each cross-section N, UFSR(N) or EU(N) or group of cross-sections R to S, UFSR(UFSR(R:S) or EU(R:S). As this data will be used to control the exposure of the meniscus regions to be solidified and as the region to be solidified may not be completely located at the material surface (i.e., working surface of the material), it may be necessary to calibrate or modify the exposure data to account for changes in the positioning commands necessary to accurately position a beam onto the meniscus region.

2. Expose cross-section N (or the last cross-section of the group of cross-sections R to S).

3. Relatively dip the partially formed object or part (e.g. an elevator that the part is being build on) downward into the building material by an amount $Z_1$. $Z_1$ preferably ranges from 0 mm to 6 mm, with the more preferred amount being less than 1 mm and most preferably about 0 mm 4. Relatively raise the part upward by an amount $Z_1+Z_2$ such that the upper surface of the last solidified lamina is located a distance $Z_2$ above the surface of the building material. $Z_2$ preferably ranges from 1 layer thickness to 10 mm.

5. Pause the system for a time period $t_1$ to allow the building material to run off and form a meniscus in the lamina-to-lamina discontinuities. $t_1$ preferably ranges from 0 to 180 seconds and preferably is less than about 45–60 seconds.

6. Relatively move the part downward by an amount equal to $Z_2-n*a$ so that the part is located n layers, each of thickness a, above the material surface. This position is the meniscus smoothing position. A preferred value for ∩ is one.

7. Pause the system for a time $t_2$ to allow material stabilization. $t_2$ preferably ranges from 0 to 30 seconds and is more preferably less than 5–10 seconds.

8. Expose the meniscus smoothing region(s) for lamina N (or lamina range R to S) with a sufficient quantity of radiation to cause solidification and adhesion.

9. Move the part as appropriate to allow formation of the next lamina. A similar set of steps can be applied for the meniscus smoothing of down-facing regions. However, to ensure that solidifying radiation does not pass beyond the lower extents of the meniscus region and on to the working surface below, it may be desirable to cause the beam to strike the meniscus region at an angel that is appropriate for allowing total internal reflection to inhibit the beam from passing beyond the meniscus region.

The initially supplied contour of cross-sectional data referred to herein may be initially supplied (e.g. SLC data) or alternatively it may be sliced data (e.g. SLI data as produced by Cslice) derived from slicing a standard STL file or obtained from other means.

The preferred technique for smoothing down-facing regions on lamina N involved exposing regions through lamina N+1 using the DFSR (N) data with appropriate levels of exposure to solidify the smoothing regions on lamina N as illustrated in FIG. 2.

It will be apparent to a skilled artisan that the embodiments and implementations illustrated above have many variations. For example, step S1 of the illustrated implementation requires determining all potential smoothing regions for layers N−1, N and N+1. However, some of these potential smoothing regions, such as for layers N−1 and N, may have already been determined in previous repetitions of steps S1 through S3 performed for previous layers. Thus, only potential smoothing regions for layer N+1 may need to be determined for the current repetition. As another example, step S2 of the illustrated implementation requires comparing PU[N] with both PU[N−1] and PU[N+1] to determine common boundary segments. Comparison with PU[N+1] may be omitted if it is already determined that PU[N−1] has a common boundary segment with PU[N]. Many more variations of the illustrated implementation may be possible.

The above embodiments can be pre programmed either through software or hardware into a computer system or data manipulation system equipped with memory and a processor, or a plurality of such systems having ability to exchange data and/or communicate with each other through a suitable communication link. Different steps of the method may be performed by different computer systems, and interim and/or final results of any step may be saved into memory or other storage device such as a hard disk and/or communicated to other computer systems.

While the description above refers to particular embodiments of the present invention, it will be understood that many modifications may be made without departing from the spirit thereof. For example, width conditions other than those described may be used. The width of a region may also be defined using other than erosion techniques. Further, although an implementation of the invention is described for a polyline representation of contours, the invention is equally applicable to a bitmap representation. (A bitmap is a matrix representing a cross-section in which the matrix elements corresponding to the solid regions of a cross-section are given a first value such as 1 and the matrix elements corresponding to the hollow regions are given a second value such as 0. Up- and down-facing regions of a cross-section may be determined by comparing the matrix elements of two adjacent layers.)

Moreover, although the illustrated embodiments describe various applications of the interpolated data, the contour data interpolation methods and apparatus of the present invention are not intended to be limited to these applications. Thus, broadly defined, the embodiments of the present invention are methods for reconstructing surface information between contour layers. For example a combination of the smoothing data and the original data may be used to define an enhanced surface representation of the object and that enhanced surface representation may be used as a basis for slicing the object along a different slicing axis. The various embodiments may also be combined to provide further enhanced data. For example, the embodiment for finding intermediate cross-sectional data may be used to define additional cross-sections of information or to define replacement cross-sectional information at different levels than that initially supplied. These additional or replacement cross-sections may then be processed further so that estimated smoothing regions may be defined for them. As a second example, the sizing embodiments may be utilized to derive enhanced data and then the resulting cross-sectional data may be further processed to provide smoothing regions therefor. Such surface information reconstruction may be performed concurrently during the formation of the object, or before the actual formation of the object, in which case the surface information may be stored for use in subsequent object formation.

The presently disclosed embodiments are therefore to be considered in all respects as illustrative and not restrictive, the scope of the invention being indicated by the appended claims, rather than the foregoing description. The accompanying claims are intended to cover such and other modifications as would fall within the true scope and spirit of the present invention. All changes which come within the meaning and range of equivalency of the claims are therefore intended to be embraced therein.

What is claimed:

1. A method of deriving intermediate data representing a region, for at least a portion of a three-dimensional object, intermediate to spaced cross-sectional data descriptive of the three-dimensional object, comprising the steps of:

supplying first data representative of a first cross-section;

supplying second data representative of a second cross-section adjacent to said first cross-section;

supplying third data representative of a third cross-section adjacent to said second cross-section;

deriving first outward-facing data including comparing the first and second data;

deriving second outward-facing data including comparing the second and third data;

determining which portions of the first outward-facing data have a common boundary with the second outward facing data; and deriving intermediate data for a region between the first and second cross-sections or between the second and third cross-sections using said portions of at least one of said first or second outward-facing data having a common boundary.

2. The method of claim 1 wherein the intermediate data includes a representation for at least one entire cross-section intermediate to said first and second cross-section or intermediate to said second and third cross-section.

3. The method of claim 2 wherein the at least one cross-section is at least two cross-sections.

4. The method of claim 1 wherein the intermediate data defines a region which is only a portion of at least one intermediate cross-section.

5. The method of claim 4 wherein the at least one intermediate cross-section is at least two intermediate cross-sections.

6. The method of claim 4 wherein the first outward facing data and the second outward facing data define downward facing regions and the intermediate data defines an estimated sloped down-facing region.

7. The method of claim 4 wherein the first outward facing data and the second outward facing data define upward facing regions and the intermediate data defines an estimated sloped up-facing region.

8. The method of claim 1 additionally comprising the steps of:

determining a width of the first outward facing region;

determining a width of the second outward facing region; and using the widths of the first and second outward facing regions in the step of deriving the intermediate data.

9. The method of claim 8 wherein the step of using said portions only uses the portions where the ratio of widths of the first and second outward facing regions is within a specified range.

10. The method of claim 9 wherein the range is from 0.3 to 3.

11. The method of claim 10 wherein the range is from 0.5 to 2.

12. The method of claim 11 wherein the range is from 0.9 to 1.1.

13. The method of claim 1 additionally comprising the steps of repeating the supplying, deriving and determining steps for each cross-section of the object, to derive intermediate data for each pair of adjacent cross-sections.

14. The method of claim 13 wherein the data is used to form a three-dimensional object, additionally comprising the steps of:
   supplying a solidifiable medium;
   forming cross-sections of the three-dimensional object from said solidifiable medium according to said data representative of cross-sections; and
   forming intermediate regions according to said intermediate data.

15. The method of claim 14 wherein the solidifiable medium is a photopolymer and the step of forming cross-sections additionally comprises the steps of:
   forming a layer of photopolymer adjacent to a previously solidified cross-section of the object; and
   selectively exposing the layer of photopolymer to a curing medium, according to said cross-sectional data, to form a solidified cross-section of the object adhered to the previously solidified cross-section of the object; and
   repeating the steps of forming a layer of photopolymer and exposing the layer of photopolymer plurality of times to form said three-dimensional object.

16. The method of claim 1 wherein the deriving and determining steps involve operations on boundary representations of cross-sectional regions.

17. The method of claim 1 wherein the deriving and determining steps involve operations on bit map representations of cross-sectional regions.

18. The method of claim 1 additionally comprising the steps of providing at least some of the first data, second data, third data, first outward facing data, second outward facing data, and intermediate data for use in forming the three-dimensional object.

19. The method of claim 18 additionally comprising the step of forming the three-dimensional object.

20. The method of claim 19 wherein the step of forming the three dimensional object forms the three-dimensional object according to the principles of at least one of (1) stereolithography, (2) selective deposition modeling, and (3) laminated object manufacturing.

21. An apparatus for deriving intermediate data representing a region, for at least a portion of a three-dimensional object, intermediate to spaced cross-sectional data descriptive of the three-dimensional object, comprising:
   a first memory for receiving first data representative of a first cross-section;
   a second memory for receiving second data representative of a second cross-section adjacent to said first cross-section;
   a third memory for receiving third data representative of a third cross-section adjacent to said second cross-section;
   a first processor operating under control of a first algorithm for deriving first outward-facing data by comparing the first and second data;
   a fourth memory for storing the first outward facing data;
   a second processor operating under control of a second algorithm for deriving second outward-facing data by comparing the second and third data;
   a fifth memory for storing the second outward facing data;
   a third processor operating under control of a third algorithm for determining which portions of the first outward-facing data have a common boundary with the second outward facing data; and
   a fourth processor operating under control of a fourth algorithm for deriving intermediate data for a region between the first and second cross-sections or between the second and third cross-sections using said portions of at least one of said first or second outward-facing data having a common boundary.

22. The apparatus of claim 21 wherein the first and second algorithms are a single algorithm.

23. The apparatus of claim 21 wherein at least two of the first through fourth processors are the same processor.

24. The apparatus of claim 21 wherein at least two of the first through fifth memories are the same memory.

25. The apparatus of claim 21 additionally comprising means for forming the three-dimensional object.

26. A method for converting a first set of cross-sectional data representing a three-dimensional object to be formed into a second set of cross-sectional data, different from the first set, representing the three-dimensional object to be formed, comprising the steps of:
   a. supplying data representing a first group of cross-sections of the first set of cross-sectional data, including supplying first, second and third data representing three consecutive cross-sections, respectively;
   b. deriving first outward-facing data including comparing the first and second data;
   c. deriving second outward-facing data including comparing the second and third data;
   d. determining which portions of the first outward-facing data have a common boundary with the second outward facing data; and
   e. deriving intermediate data for the region between the first and second cross-sections or between the second and third cross-sections using said portions of at least one of said first or second outward-facing data having a common boundary;
   f. repeating steps (a)–(e) until all intermediate data is derived;
   g. supplying data representing desired placement levels and/or orientation information for cross-sections making up the second set of cross-sectional data;
   h. using the intermediate data and possibly the first set of cross-sectional data in combination with the data representing placement levels for the second set of cross-sectional data, to derive data representing the cross-sections of the second set.

27. The method of claim 26 where the second set of data has a smaller spacing between cross-sections than the spacing between at least some of the cross-sections of the first set.

28. The method of claim 26 wherein the second set of data has a larger spacing between cross-sections than the spacing between at least some of the cross-sections of the first set.

29. The method of claim 26 wherein the second set of data has a different cross-sectional orientation than the first set.

30. The method of claim 26 wherein the data of the first set and the intermediate data is in the form of boundary representations.

31. The method of claim 30 wherein the step of using includes the steps of:
   cutting the intermediate data and the first set of cross-sectional data with planes placed and oriented to match individual cross-sections of the second set; and
   finding intersection points between the boundary representations and the planes; and
   forming the data representing the second set including the step of connecting the intersection points.

32. A method for converting a cross-sectional representation of a three-dimensional object into a surface or solid representation of the three-dimensional object, comprising the steps of:

a. supplying the cross-sectional data, including data representing a first group of consecutive cross-sections including first, second and third data representing three consecutive cross-sections, respectively;
b. deriving first outward-facing data including comparing the first and second data;
c. deriving second outward-facing data by including comparing the second and third data;
d. determining which portions of the first outward-facing data have a common boundary with the second outward facing data; and
e. deriving intermediate data for the region between the first and second cross-sections or between the second and third cross-sections using said portions of at least one of said first or second outward-facing data having a common boundary;
f. repeating steps (a)–(e) until all intermediate data is derived;
g. forming a surface or solid data representation using the cross-sectional data and intermediate data.

* * * * *

UNITED STATES PATENT AND TRADEMARK OFFICE
CERTIFICATE OF CORRECTION

PATENT NO. : 6,084,980
DATED : July 4, 2000
INVENTOR(S) : Nguyen et al.

It is certified that error appears in the above-identified patent and that said Letters Patent is hereby corrected as shown below:

Column 22,
Line 59, "OSCS[N]=CS[N]30 SU[N]-HD[N]." should read -- OSCS[N] = CS[N] + SU[N] - HD[N]. --

Signed and Sealed this

Twenty-ninth Day of January, 2002

JAMES E. ROGAN
Director of the United States Patent and Trademark Office

Attest:

Attesting Officer